(12) United States Patent
Kaneko

(10) Patent No.: US 7,911,941 B2
(45) Date of Patent: Mar. 22, 2011

(54) SCHEDULING METHOD FOR EXECUTING JOB, SCHEDULING APPARATUS FOR EXECUTING JOB, AND COMMUTATIVE RECORDING MEDIUM HAVING RECORDED THEREON SCHEDULING PROGRAM FOR CAUSING EXECUTION OF JOB

(75) Inventor: Nobuyuki Kaneko, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 428 days.

(21) Appl. No.: 12/038,468

(22) Filed: Feb. 27, 2008

(65) Prior Publication Data
US 2008/0219273 A1    Sep. 11, 2008

(30) Foreign Application Priority Data

Mar. 5, 2007  (JP) ................................. 2007-054766

(51) Int. Cl.
*H04L 12/26* (2006.01)
*H04L 12/28* (2006.01)
(52) U.S. Cl. ....................................... 370/220; 370/401
(58) Field of Classification Search .................. None
See application file for complete search history.

(56) References Cited

FOREIGN PATENT DOCUMENTS

| JP | A 2002-232448 | 8/2002 |
|---|---|---|
| JP | A 2005-192027 | 7/2005 |

*Primary Examiner* — Salman Ahmed
*Assistant Examiner* — Blanche Wong
(74) *Attorney, Agent, or Firm* — Greer, Burns & Crain, Ltd.

(57) ABSTRACT

A router interposed between a subnet and a backbone network, where the subnet includes a plurality of layer 2 switches and a plurality of terminals. The terminals communicate with each other via the layer 2 switches and a master router, wherein the router connects to the master router, the subnet and the backbone network, and originally operates as a backup router, but can be transitioned to operate as a redundant master router. The router includes a severance detection unit for detecting severance between the layer 2 switches and a redundant function control unit which, when severance has been detected: (i) resumes interrupted communication between the backbone network and the subnet via the router, (ii) receives, from the master router, a copy of an address resolution protocol (ARP) table, and stores the copy of the ARP table in the router, and (iii) transitions the router into a redundant master router.

11 Claims, 16 Drawing Sheets

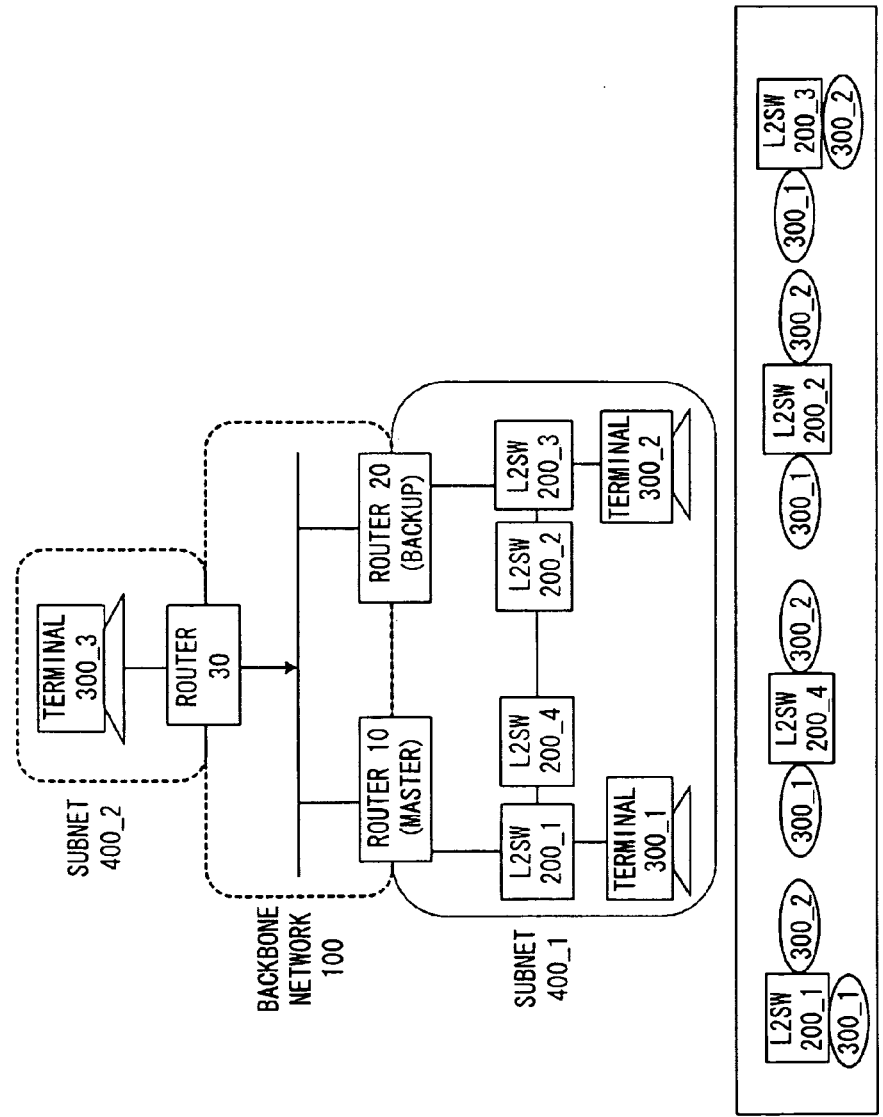

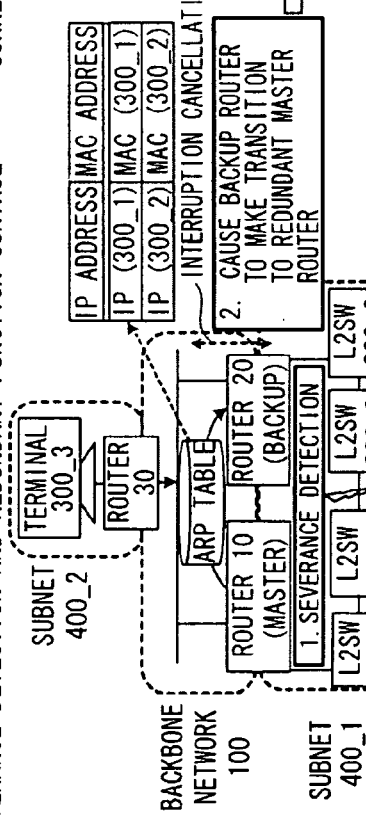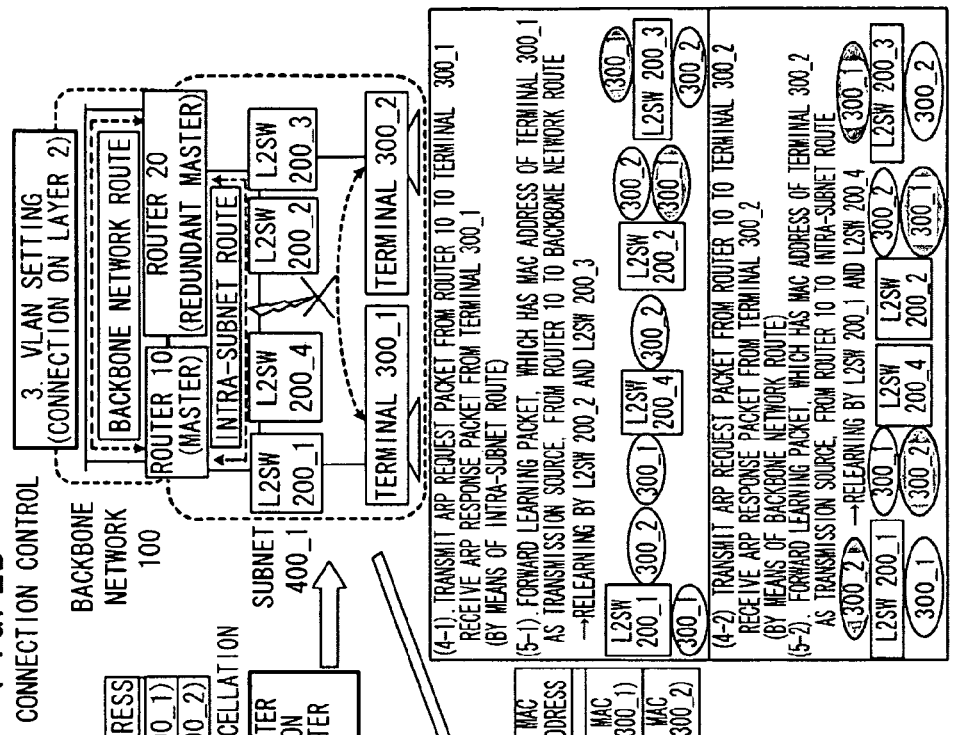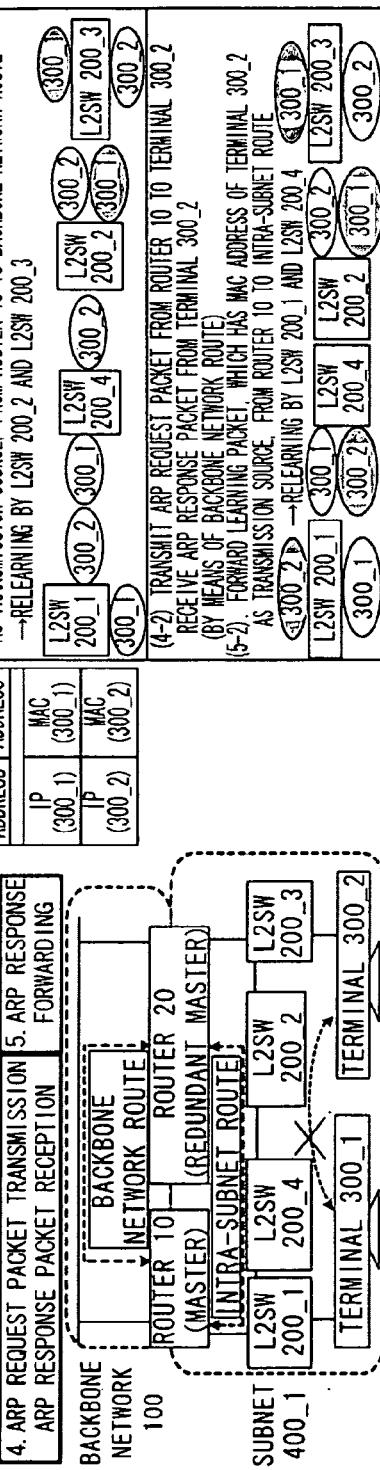

FIG. 4A

| MAC-DA BC | MAC-SA MAC (ROUTER 10) | ARP REQUEST TO IP (300_1) |
|---|---|---|

FIG. 4B

| MAC-DA BC | MAC-SA MAC (ROUTER 10) | ARP REQUEST TO IP (300_2) |
|---|---|---|

FIG. 4C

| MAC-DA MAC (ROUTER 10) | MAC-SA MAC (300_1) | ARP RESPONSE IP (300_1) |
|---|---|---|

FIG. 4D

| MAC-DA MAC (ROUTER 10) | MAC-SA MAC (300_2) | ARP RESPONSE IP (300_2) |
|---|---|---|

FIG. 5A

| MAC-DA | MAC-SA | ARP RESPONSE |
| BC | MAC (300_1) | IP (300_1) |

FIG. 5B

| MAC-DA | MAC-SA | ARP REQUEST |
| BC | MAC (300_2) | IP (300_2) |

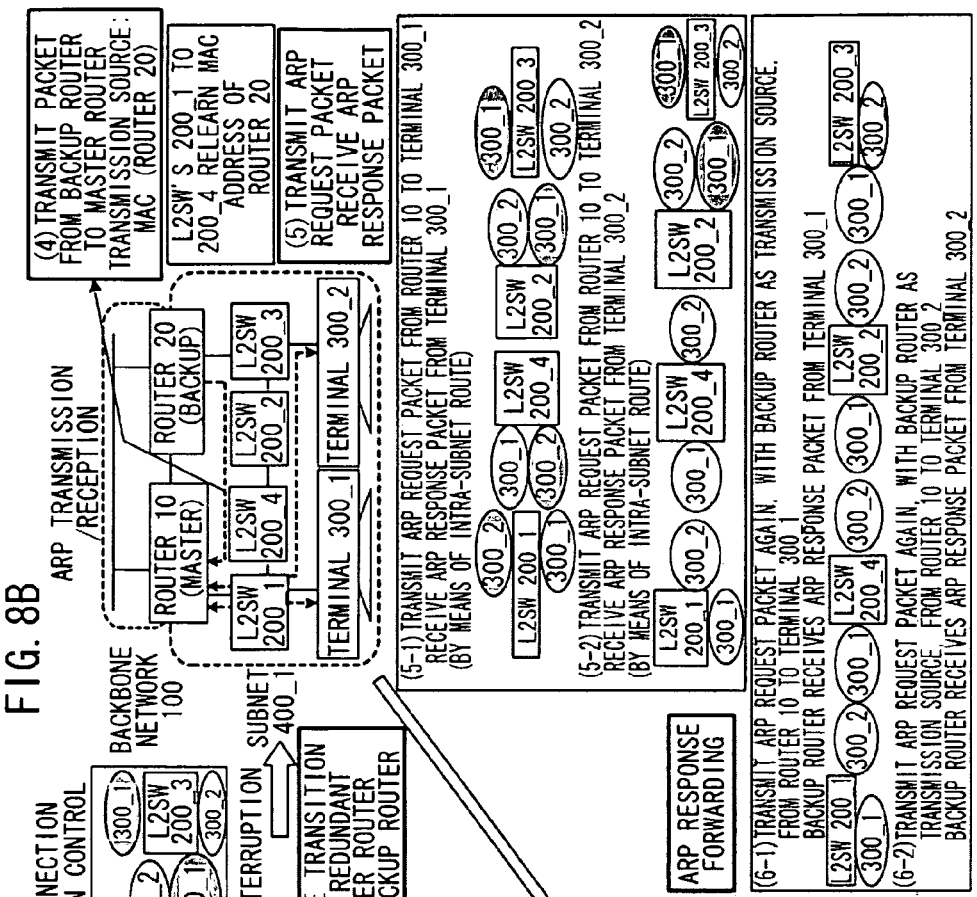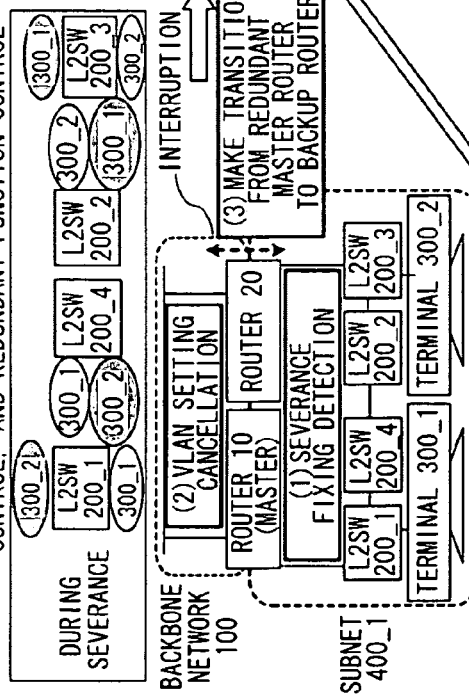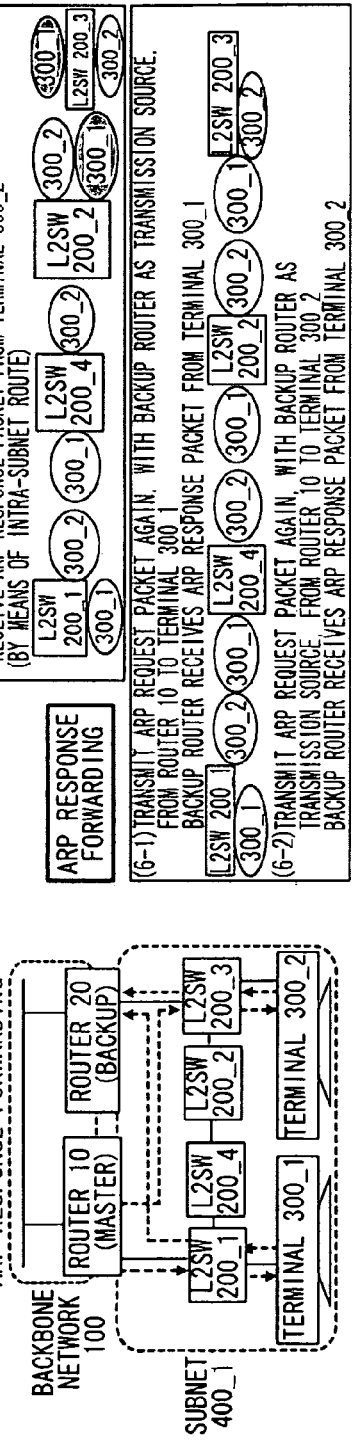

FIG. 9A

| MAC-DA<br>BC | MAC-SA<br>MAC (ROUTER 10) | ARP REQUEST<br>"TO IP (300_1)"<br>TRANSMISSION SOURCE:<br>MAC (ROUTER 20), IP (ROUTER 20) |
|---|---|---|

FIG. 9B

| MAC-DA<br>BC | MAC-SA<br>MAC (ROUTER 10) | ARP REQUEST<br>"TO IP (300_2)"<br>TRANSMISSION SOURCE:<br>MAC (ROUTER 20), IP (ROUTER 20) |
|---|---|---|

FIG. 9C

| MAC-DA<br>MAC (ROUTER 20) | MAC-SA<br>MAC (300_1) | ARP RESPONSE<br>IP (300_1) |
|---|---|---|

FIG. 9D

| MAC-DA<br>MAC (ROUTER 20) | MAC-SA<br>MAC (300_2) | ARP RESPONSE<br>IP (300_2) |
|---|---|---|

FIG. 13A

| MAC-DA<br>BC | MAC-SA<br>MAC (ROUTER 10) | ARP REQUEST<br>TO IP (300_1) |
|---|---|---|

FIG. 13B

| MAC-DA<br>BC | MAC-SA<br>MAC (ROUTER 20) | ARP REQUEST<br>TO IP (300_2) |
|---|---|---|

FIG. 13C

| MAC-DA<br>MAC (ROUTER 10) | MAC-SA<br>MAC (300_1) | ARP RESPONSE<br>IP (300_1) |
|---|---|---|

FIG. 13D

| MAC-DA<br>MAC (ROUTER 20) | MAC-SA<br>MAC (300_2) | ARP RESPONSE<br>IP (300_2) |
|---|---|---|

FIG. 14A

| MAC-DA BC | MAC-SA MAC(300_1) | ARP REQUEST IP(300_1) |
|---|---|---|

FIG. 14B

| MAC-DA BC | MAC-SA MAC(300_2) | ARP REQUEST IP(300_2) |
|---|---|---|

SCHEDULING METHOD FOR EXECUTING JOB, SCHEDULING APPARATUS FOR EXECUTING JOB, AND COMMUTATIVE RECORDING MEDIUM HAVING RECORDED THEREON SCHEDULING PROGRAM FOR CAUSING EXECUTION OF JOB

BACKGROUND

There has heretofore been a method which, by redundantly configuring routers (a master router and a backup router) based on a protocol such as a VRRP (Virtual Router Redundancy Protocol), guarantees communication between terminals within a subnet and a terminal in another network, using the backup router, even in the event that a failure occurs in the master router.

Also, there being a plurality of layer 2 switches within the subnet, for example, in the event that a connection between the layer 2 switches has been severed, a terminal within the subnet appears which cannot communicate with the terminal in the other network by way of the master router. Assuming this kind of case, JP-A-2005-192027 discloses a network control system which, by causing the backup router to make a transition to the master router, guarantees the communication between the terminal within the subnet, which cannot communicate with the terminal in the other network by way of the original master router, and the terminal in the other network, by using the backup router which has made the transition to the master router.

Furthermore, there being a plurality of layer 2 switches within the subnet, for example, in the event that a connection between the layer 2 switches has been severed, a combination of terminals appears which cannot communicate with each other within the subnet. Assuming this kind of case, JP-A-2002-232448 discloses a network system which uses the redundantly configured router to enable the communication between the terminals within the subnet via a backbone network. However, with the technology disclosed therein, an efficient medium access control (MAC) address relearning cannot be expected during the severance and a fixing thereof within the subnet. Specifically, as it is necessary for each of the terminals within the subnet, during the severance, to relearn MAC addresses of the terminals other than itself, and furthermore, during the fixing too, to relearn the MAC addresses of the terminals other than itself in a condition before the severance, there are many processes carried out by the terminals, and a load on the network is large, preventing the efficient MAC address relearning.

SUMMARY

According to an aspect of an embodiment, a router is interposed between a subnet, configured of a plurality of layer 2 switches, which relay an address resolution protocol (ARP) response packet and learn an MAC address, and a plurality of terminals connected to the layer 2 switches, and a backbone network. The router connects the subnet and the backbone network, and operates as a master router or a backup router.

The router has a severance detection unit which detects an existence or otherwise of a severance within the subnet;

a redundant function control unit which, in the event that the severance within the subnet has been detected by the severance detection unit, as well as resuming interrupted communication between the backup router and the backbone network and subnet, stores an ARP table, in which are correlated internet protocol (IP) addresses and MAC addresses of the plurality of terminals stored by the master router, in the backup router, and carries out a control in such a way as to cause the backup router to make a transition to a redundant master router;

a connection control unit which sets a virtual local area network (VLAN), set in the subnet, for the backbone network too, and connects the master router and the backup router which functions as the redundant master router, on a layer 2 by means of the backbone network;

an ARP transmission/reception unit which transmits an ARP request packet, which requests an MAC address for an IP address of each of the plurality of terminals included in the ARP table, to an intra-subnet route and a backbone network route connected thereto by the connection control unit, and receives an ARP response packet, which has the MAC address of the terminal as a transmission source, from the terminal by means of the intra-subnet route or the backbone network route; and an ARP response forwarding unit which generates a learning packet which has the MAC address of the terminal, stored in the ARP response packet received by the ARP transmission/reception unit, as the transmission source, and forwards it to a route, a reversal of a route by means of which the ARP response packet has been received.

DRAWINGS

FIG. 1 is a diagram for illustrating an outline of a router in an embodiment 1;

FIGS. 2A to 2C are diagrams for illustrating features of the router in the embodiment 1;

FIGS. 4A to 4D are diagrams for illustrating a packet transmission/reception unit in the embodiment 1;

FIGS. 5A and 5B are diagrams for illustrating an ARP response forwarding unit in the embodiment 1;

FIGS. 8A to 8C are diagrams for illustrating an outline and features of a router in an embodiment 2;

FIGS. 9A to 9D are diagrams for illustrating an ARP response forwarding unit in the embodiment 2;

FIGS. 13A to 13D are diagrams for illustrating a packet transmission/reception unit in the embodiment 3;

FIGS. 14A and 14B are diagrams for illustrating an ARP response forwarding unit in the embodiment 3;

EMBODIMENTS

Figure 3:
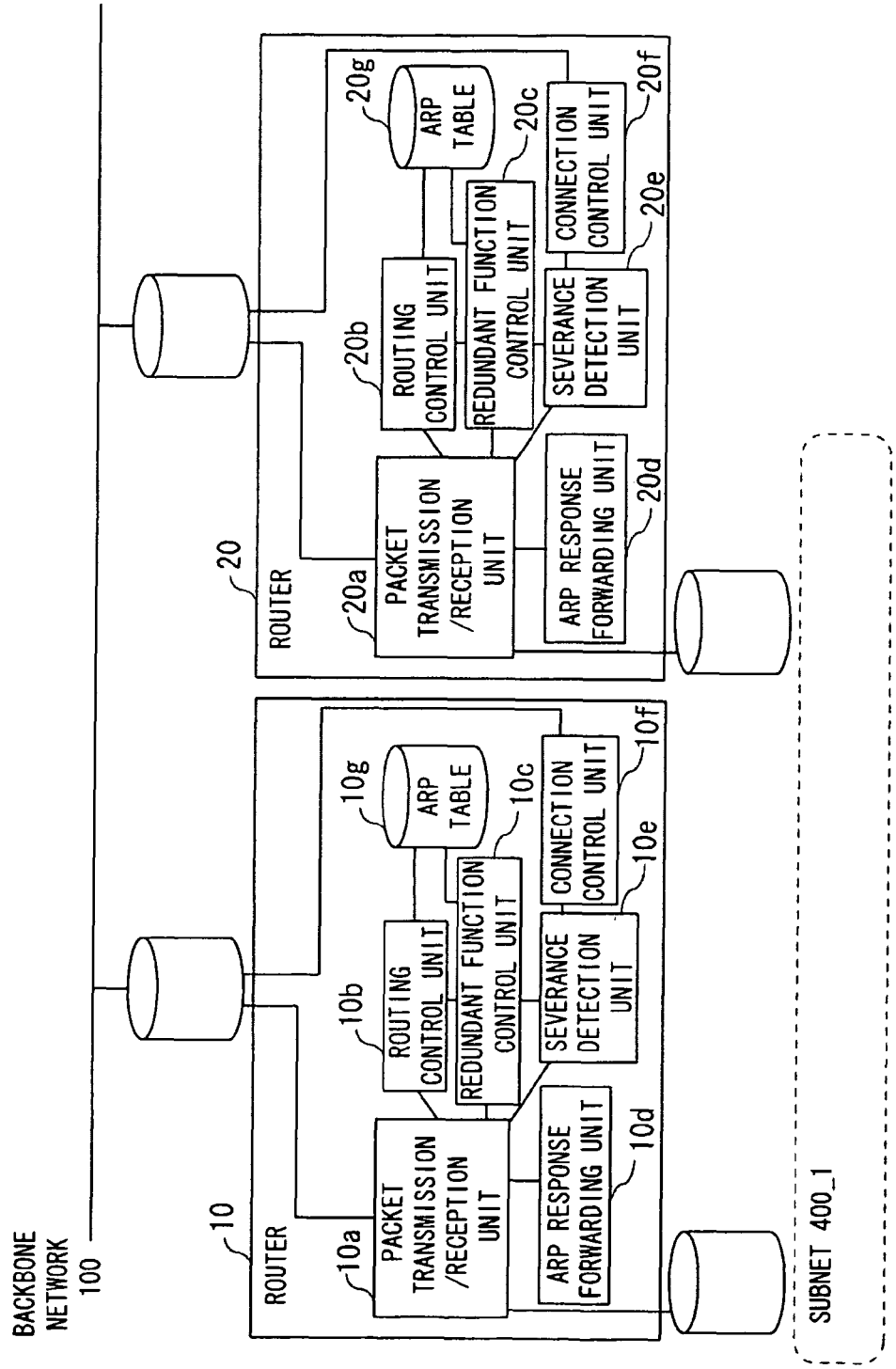
FIG. 3 is a block diagram showing a configuration of the router in the embodiment 1.

Hereafter, a detailed description will be given, referring to the accompanying drawings, of embodiments of a router, a communication guarantee method and a communication guarantee program according to some aspects of the invention. Hereafter, routers to which the invention is applied will be described as embodiments. Also, hereafter, a configuration and processing steps of a router in an embodiment 1, and an advantage of the embodiment 1 will be described in order and, next, in the same way as in the embodiment 1, a router according to an embodiment 2, a router according to an embodiment 3, and a router according to an embodiment 4 will be described in order.

Outline and Features of Router in Embodiment 1

Firstly, a specific description will be given, using FIGS. 1 and 2A to 2C, of main features of the router in the embodiment 1. FIG. 1 is a diagram for illustrating an outline of the router in the embodiment 1, and FIGS. 2A to 2C are diagrams for illustrating features of the router in the embodiment 1.

The router in the embodiment 1 has an outline such as to, being interposed between a subnet, configured of a plurality of layer 2 switches, which relay an ARP response packet and learn MAC addresses, and a plurality of terminals connected to the layer 2 switches, and a backbone network, connect both networks by means of a redundant configuration, acting as a master router or a backup router.

For example, as shown in FIG. 1, a router 10 as the master router, and a router 20 as the backup router are interposed between a subnet 400_1, configured of four layer 2 switches (an L2SW 200_1 to an L2SW 200_4) and "a "terminal 300_1 connected to the L2SW 200_1" and a "terminal 300_2 connected to the L2SW 200$_{13}$ """, and a backbone network 100. The routers 10, 20 connect both networks by means of the redundant configuration. By this means, for example, when the router 10 fails, the router 20 functions in place of the router 10, thereby guaranteeing communication with a terminal in another network.

Also, the terminal 300_1 and the terminal 300_2 carry out communication with a terminal 300_3 in a subnet 400_2 which is the other network. At this time, the router 10, which is the master router in the subnet 400_1, and the router 30, which is the router in the subnet 400_2, intervene in the communication between these terminals. Furthermore, the terminal 300_1 and the terminal 300_2, contained in the subnet 400_1, carry out communication with each other via the four layer 2 switches (the L2SW 200_1 to the L2SW 200_4).

Herein, the "ARP response packet" is, for example, a packet which, equipment A transmits, by means of a broadcast, an "ARP request packet", which indicates that "the equipment with the IP address B wants its own MAC address to be transmitted to the equipment A", in order to check an MAC address of equipment allotted with an IP address B, the equipment allotted with the IP address B, which has received the "ARP request packet", transmits to the equipment A in order to notify the equipment A of its own MAC address.

That is, each of the layer 2 switches (the L2SW 200_1 to the L2SW 200_4) shown in FIG. 1, by relaying the ARP response packet transmitted and received between the terminal 300_1 and the terminal 300_2, learns MAC addresses of the terminals 300_1 and the terminal 300_2, correlating them to directions (port numbers) in which the terminals are connected. Specifically, as shown in the diagram at the bottom of FIG. 1, in the subnet 400_1, the L2SW 200_1 learns that the terminal 300_1 exists in a down direction, and that the terminal 300_2 exists in a right direction, correlating them to the MAC addresses of the terminal 300_1 and the terminal 300_2. In the same way, the L2SW 200_4 and the L2SW 200_2 learn that the terminal 300_1 exists in a left direction, and that the terminal 300_2 exists in a right direction, correlating them to the MAC addresses of the terminal 300_1 and the terminal 300_2. Furthermore, the L2SW 200_3 learns that the terminal 300_1 exists in a left direction, and that the terminal 300_2 exists in a down direction, correlating them to the MAC addresses of the terminal 300_1 and the terminal 300_2.

Herein, the invention's main features lie in enabling an efficient relearning of the MAC addresses. To describe the main features simply, the router in the embodiment 1 detects an existence or otherwise of a severance within the subnet. Specifically, the router 10 which is the master router transmits a monitoring packet at regular time intervals (for example, every second) to the router 20 which is the backup router, and the router 20, by receiving the monitoring packet at regular time intervals (for example, every second), confirms communication (no severance) within the subnet 400_1. For example, as shown in FIG. 2A, when a failure occurs between the L2SW 200_4 and the L2SW 200_2, causing a severance within the subnet 400_1, the router 20, as a condition continues in which it does not receive the monitoring packet from the router 10, detects the severance within the subnet 400_1 (refer to FIG. 2A-Box 1). At this time, the router 20 notifies the router 10, via the backbone network 100, that the severance has been caused within the subnet 400_1. As the monitoring packet, for example, a packet such as a BPDU (Bridge Protocol Data Unit) packet or a Ping is used.

Then, in the event that the severance within the subnet has been detected, the router in the embodiment 1 resumes the interrupted communication between the router 20, which is the backup router, and the backbone network 100 and the subnet 400_1. That is, normally, the router 20, which is the backup router, has the communication with the backbone network 100 and the subnet 400_1 interrupted, except in the case of the reception of the monitoring packet, the notification of the severance detection, or the like. However, in the event that the severance within the subnet 400_1 has been detected, as shown in FIG. 2A, the router 20 ends the interruption of the communication, and carries out, for example, a transmission and reception of a packet to and from the terminal 300_1 or the terminal 300_2.

At the same time, the router in the embodiment 1 stores the ARP table, stored by the router 10 which is the master router, in which are correlated the IP addresses and MAC addresses of the plurality of terminals, in the router 20 which is the backup router, and carries out a control in such a way as to cause the router 20 to make a transition to a redundant master router. That is, the router 10 which is the master router stores the IP addresses and MAC addresses of the terminal 300_1 and terminal 300_2, contained by the subnet 400_1, as "IP (300_1): MAC (300_1)" and "IP (300_2): MAC (300_2)", as shown in FIG. 2A. Herein, the router 10, on receiving the notification of the severance within the subnet 400_1 from the router 20, copies the ARP table, and transmits the copied ARP table to the router 20, which is the backup router, via the backbone network 100. The router 20 which is the backup router, by receiving and storing the copied ARP table, makes the transition from the backup router to the redundant master router (refer to FIG. 2A-Box 2). Also, after this, the router 20 which is the redundant master router starts a transmission of the monitoring packet to the router 10.

The communication between the terminal 300_2 and the terminal 300_3 contained in the subnet 400_2 (FIG. 1) becomes possible via the router 20 which is the redundant master router in FIG. 2B, guaranteeing communication between the subnets during the severance.

Then, the router in the embodiment 1 sets the VLAN, set in the subnet 400_1, for the backbone network 100 too, and connects the router 10, which is the master router, and the router 20, which functions as the redundant master router, on the layer 2 by means of the backbone network 100. That is, as shown in FIG. 2B, it sets a VID (VLAN identifier) of the VLAN, heretofore set in the subnet 400_1, for the backbone network 100 too, and establishes a "backbone network route" connecting the router 10 and the router 20 on the layer 2 by means of the backbone network 100, in addition to an "intra-subnet route".

Then, the router in the embodiment 1 transmits an ARP request packet, which requests an MAC address for an IP address of each of the plurality of terminals included in the ARP table, to the intra-subnet route and the backbone network route, and receives an ARP response packet, which has the MAC address of the terminal as a transmission source, from the terminal by means of the intra-subnet route or the backbone network (refer to FIG. 2C-Box 4).

Specifically, the router 10 transmits an ARP request packet, which requests the MAC address of the terminal 300_1, to the intra-subnet route and the backbone network route, at the IP address (IP (300_1)) of the terminal 300_1 included in the ARP table, and receives an ARP response packet storing "MAC address: MAC (300_1)" from the terminal 300_1 by means of the intra-subnet route (refer to FIG. 2C-4-1). Also, the router 10 transmits an ARP request packet, which requests the MAC address of the terminal 300_2, to the intra-subnet route and the backbone network, at the IP address (IP (300_2)) of the terminal 300_2 included in the ARP table, and receives an ARP response packet storing "MAC address: MAC (300_2)" from the terminal 300_2 by means of the backbone network (refer to FIG. 2C-4-2).

Then, the router in the embodiment 1 generates a learning packet having a terminal MAC address stored in the received ARP response packet as the transmission source, and forwards it to a route, a reversal of a route by means of which the ARP response packet has been received (refer to FIG. 2C-Box 5). Specifically, the router 10, on receiving "MAC address: MAC (300_1)" from the terminal 300_1 by means of the intra-subnet route, generates a learning packet having "MAC address: MAC (300_1)" as the transmission source, and forwards it to the backbone network route. By this means, the L2SW 200_2 relearns that the terminal 300_1 exists in a right direction, together with "MAC address: MAC (300_1)" of the terminal 300_1, while the L2SW 200_3 relearns that the terminal 300_1 exists in an up direction, together with "MAC address: MAC (300_1)" (refer to FIG. 2C-5-1).

In the same way as this, the router 10, on receiving "MAC address: MAC (300_2)" from the terminal 300_2 by means of the backbone network route, generates a learning packet having "MAC address: MAC (300_2)" as the transmission source, and forwards it to the intra-subnet route. By this means, the L2SW 200_1 relearns that the terminal 300_2 exists in an up direction, together with "MAC address: MAC (300_2)" of the terminal 300_2, while the L2SW 200_4 relearns that the terminal 300_2 exists in a left direction, together with "MAC address: MAC (300_2)" of the terminal 300_2 (refer to FIG. 2C-5-2).

Although a description has been given, in the embodiment, of a case in which the router 10 transmits the ARP request packet, generates the learning packet from the received ARP response packet, and forwards it, the invention not being limited to this, a case is also acceptable in which the router 20 transmits the ARP request packet, generates the learning packet from the received ARP response packet, and forwards it.

With this kind of configuration, in the router in the embodiment 1, using the backbone network route connected on the layer 2, the layer 2 switches, which cannot relearn the MAC addresses by means of one route, can relearn the MAC addresses by means of the reverse route, enabling an efficient relearning of the MAC addresses, as in the heretofore described main features.

Configuration of Router in Embodiment 1

Next, a description will be given, using FIGS. 3 to 5B, of the router in the embodiment 1. FIG. 3 is a block diagram showing a configuration of the router in the embodiment 1, FIGS. 4A to 4D are diagrams for illustrating a packet transmission/reception unit in the embodiment 1, and FIGS. 5A and 5B are diagrams for illustrating an ARP response forwarding unit in the embodiment 1.

As shown in FIG. 3, the router 10 in the embodiment 1, being configured of, as components particularly relating closely to the invention, a packet transmission/reception unit 10a, a routing control unit 10b, a redundant function control unit 10c, an ARP response forwarding unit 10d, a severance detection unit 10e, a connection control unit 10f, and an ARP table 10g, is interposed between the subnet 400_1 and the backbone network 100.

Also, as shown in FIG. 3 the router 20 in the embodiment 1, including a packet transmission/reception unit 20a, a routing control unit 20b, a redundant function control unit 20c, an ARP response forwarding unit 20d, a severance detection unit 20e, and a connection control unit 20f, which carry out the same processes as the packet transmission/reception unit 10a, routing control unit 10b, redundant function control unit 10c, ARP response forwarding unit 10d, severance detection unit 10e, and connection control unit 10f which configure the router 10. The router 20 is further configured of an ARP table 20g in which is stored the same contents as those of the ARP table 10g, and is interposed between the subnet 400_1 and the backbone network 100 in the same way as the router 10.

Hereafter, a description will be given of a case in which, normally, the router 10 functions as the master router, while the router 20 functions as the backup router.

Herein, the "severance detection unit 10e" and the "severance detection unit 20e" correspond to a "severance detection unit" of the claims, the "redundant function control unit 10c" and the "redundant function control unit 20c" correspond to a "redundant function control unit" of the claims, the "connection control unit 10f" and "connection control unit 20f" correspond to a "connection control unit" of the claims, the "packet transmission/reception unit 10a" and the "packet transmission/reception unit 20a" correspond to an "ARP transmission/reception unit" of the claims, and the "ARP response forwarding unit 10d" and the "ARP response forwarding unit 20d" correspond to an "ARP response forwarding unit" of the claims.

The routing control unit 10b, referring to the ARP table 10g, to be described hereafter, controls communication between a terminal contained in the subnet 400_1 and the other network. For example, it analyzes a packet addressed to the received terminal 300_1 to detect that the packet is one addressed to the terminal contained in the subnet 400_1, and carries out a control in such a way as to transmit the packet to the terminal 300_1 by way of the L2SW 200_1. Also, it carries out a control of the transmission and reception of the monitoring packet. The routing control unit 20b of the router 20 does not normally function by means of the redundant function control unit 20c, to be described hereafter.

The packet transmission/reception unit 10a transmits a packet from the terminal contained in the subnet 400_1 by way of the backbone network 100, or receives a packet from the other network by way of the backbone network 100. Also, it carries out the transmission of the monitoring packet. The packet transmission/reception unit 20a of the router 20 does not normally function, except in the case of the reception of the monitoring packet or a transmission of a result of the severance detection by the severance detection unit 20e, to be described hereafter, by means of the redundant function control unit 20c, to be described hereafter.

The severance detection unit 10e and the severance detection unit 20e detect an existence or otherwise of a severance within the subnet. Specifically, the packet transmission/reception unit 10a of the router 10 which is the master router transmits the monitoring packet at the regular time intervals (for example, every second) to the packet transmission/reception unit 20a of the router 20 which is the backup router, and the severance detection unit 20e, by detecting that the packet transmission/reception unit 20a receives the relevant monitoring packet at the regular time intervals (for example, every second), confirms communication (no severance) within the subnet 400_1.

Herein, for example, when a failure occurs between the L2SW 200_4 and the L2SW 200_2, causing a severance within the subnet 400_1, as shown in FIG. 2A, the severance detection unit 20e, as a condition continues in which the packet transmission/reception unit 20a does not receive the monitoring packet from the packet transmission/reception unit 10a, detects the severance within the subnet 400_1 (refer to FIG. 2A-1). At this time, the severance detection unit 20e transmits a packet for notifying the router 10 that the severance has been caused within the subnet 400_1, from the packet transmission/reception unit 20e via the backbone network 100 to the packet transmission/reception unit 10a, and the severance detection unit 10e detects, from the severance notification packet received by the packet transmission/reception unit 10a, that the severance has been caused within the subnet 400_1. As the monitoring packet, a packet such as, for example, the BPDU (Bridge Protocol Data Unit) packet or the Ping is used.

The redundant function control unit 20c, in the event that the severance within the subnet has been detected, resumes the interrupted communication between the backup router and the backbone network 100 and subnet 400_1. That is, although the router 20 which is the backup router normally has the communication with the backbone network 100 and the subnet 400_1 interrupted, except in the case of the reception of the monitoring packet or the notification of the severance detection, in the event that the severance detection unit 20e has detected the severance within the subnet 400_1, the redundant function control unit 20c, by activating the function of the packet transmission/reception unit 20a, ends the interruption of the communication with the networks, and carries out, for example, a transmission and reception of a packet to and from the terminal 300_1 or the terminal 300_2.

At the same time, the redundant function control unit 10c stores the ARP table 10g, stored by the router 10 which is the master router, in which are correlated the IP addresses and MAC addresses of the plurality of terminals, in the ARP table 20g of the router 20 which is the backup router, and carries out a control in such a way as to cause the router 20 to make the transition to the redundant master router. Herein, the ARP table 10g stores the IP addresses and MAC addresses of the terminal 300_1 and the terminal 300_2, contained by the subnet 400_1, as "IP (300_1): MAC (300_1) and "IP (300_2): MAC (300_2)", as shown in FIG. 2A.

That is, when the severance detection unit 10e detects the severance within the subnet 400_1, the redundant function control unit 10c copies the ARP table 10g, and transmits the copied ARP table 10g from the packet transmission/reception unit 10a via the backbone network 100 to the router 20. When the packet transmission/reception unit 20a receives the copied ARP table 10g, the redundant function control unit 20c stores contents thereof in the ARP table 20g. By this means, the router 20 makes the transition from the backup router to the redundant master router (refer to FIG. 2A-2). After this, the router 20 which is the redundant master router also starts the transmission of the monitoring packet to the router 10.

The connection control unit 10f and the connection control unit 20f set the VLAN, set in the subnet 400_1, for the backbone network 100 too, and connect the router 10, which is the master router, and the router 20, which functions as the redundant router, on the layer 2 by means of the backbone network 100. That is, as shown in FIG. 2B, they set the VID (VLAN Identifier) of the VLAN, heretofore set in the subnet 400_1, for the backbone network 100 too, and establish the "backbone network route" which connects the router 10 and the router 20 on the layer 2 by means of the backbone network 100, in addition to the "intra-subnet route". Although a description is given, in the embodiment, of a case in which the connection control unit 20f carries out the VLAN setting, a case is also acceptable in which the connection control unit 10f carries out the VLAN setting.

The packet transmission/reception unit 10a transmits an ARP request packet, which requests an MAC address for an IP address of each of the plurality of terminals included in the ARP table 10g, to the intra-subnet route and the backbone network route, and receives an ARP response packet, which has the MAC address of the terminal as the transmission source, from the terminal by means of the intra-subnet route or the backbone network route (refer to FIG. 2C-4).

Specifically, the packet transmission/reception unit 10a transmits an ARP request packet, in which a transmission destination is a broadcast (MAC-DA: BC), and the transmission source MAC address (MAC-SA) is "MAC (router 10)", as shown in FIG. 4A, to the IP address (IP (300_1)) of the terminal 300_1 included in the ARP table 10g. Then, the packet transmission/reception unit 10a receives an ARP response packet, in which the transmission destination is the router 10 (MAC-DA: MAC (router 10)), and the terminal 300_1 MAC address is a transmission source (MAC-SA: MAC address: MAC (300_1)); as shown in FIG. 4C, by means of the intra-subnet route (refer to FIG. 2C-4-1).

Also, the packet transmission/reception unit 10a transmits an ARP request packet, in which the transmission destination is the broadcast (MAC-DA: BC), and the transmission source MAC address (MAC-SA) is "MAC (router 10)", as shown in FIG. 4B, to the IP address (IP (300_2)) of the terminal 300_2 included in the ARP table 10g. Then, the packet transmission/reception unit 10a receives an ARP response packet, in which the transmission destination is the router 10 (MAC-DA: MAC (router 10)), and the terminal 300_2 MAC address is a transmission source (MAC-SA: MAC address: MAC (300_2)), as shown in FIG. 4D, by means of the backbone network route (refer to FIG. 2C-4-2).

The ARP response forwarding unit 10d generates a learning packet, which has an MAC address of a terminal, stored in the received ARP response packet, as the transmission source, and forwards it to a route, a reversal of a route by means of which the ARP response packet has been received (refer to FIG. 2C-5) Specifically, when the packet transmission/reception unit 10a receives the ARP response packet shown in FIG. 4C from the terminal 300_1 by means of the intra-subnet route, the ARP response forwarding unit 10d generates a packet, which has the address of the ARP response packet changed to the broadcast, as the learning packet. Specifically, it generates a packet having "MAC-DA: BC", as shown in FIG. 5A. Then, the ARP response forwarding unit 10d, via the packet transmission/reception unit 10a, transmits the learning packet to the broadcast by way of the backbone network route. By this means, the L2SW 200_2 relearns that the terminal 300_1 exists in the right direction, together with "MAC address: MAC (300_1)" of the terminal 300_1, and the L2SW 200_3 relearns that the terminal 300_1 exists in the up direction, together with "MAC address: MAC (300_1)" of the terminal 300_1 (refer to FIG. 2C-5-1).

Also, when the packet transmission/reception unit 10*a* receives the ARP response packet shown in FIG. 4D from the terminal 300_2 by means of the backbone network route, the ARP response forwarding unit 10*d* generates a packet, which has the address of the ARP response packet changed to the broadcast, as the learning packet. Specifically, it generates a learning packet having "MAC-DA: BC", as shown in FIG. 5B. Then, the ARP response forwarding unit 10*d*, via the packet transmission/reception unit 10*a*, transmits the learning packet to the broadcast by way of the intra-subnet route. By this means, the L2SW 200_1 relearns that the terminal 300_2 exists in the up direction, together with "MAC address: MAC (300_2)" of the terminal 300_2, and the L2SW 200_4 relearns that the terminal 300_2 exists in the left direction, together with "MAC address: MAC (300_2)" of the terminal 300_2 (refer to FIG. 2C-5-2).

Although a description has been given, in the embodiment, of a case in which the packet transmission/reception unit 10*a* transmits the ARP request packet, and the ARP response forwarding unit 10*d* generates the learning packet from the received ARP response packet, and forwards it, the invention not being limited to this, a case is also acceptable in which the packet transmission/reception unit 20*a* transmits the ARP request packet, and the ARP response forwarding unit 20*d* generates the learning packet from the received ARP response packet, and forwards it.

Steps of Process of Router in Embodiment 1

Figure 6:
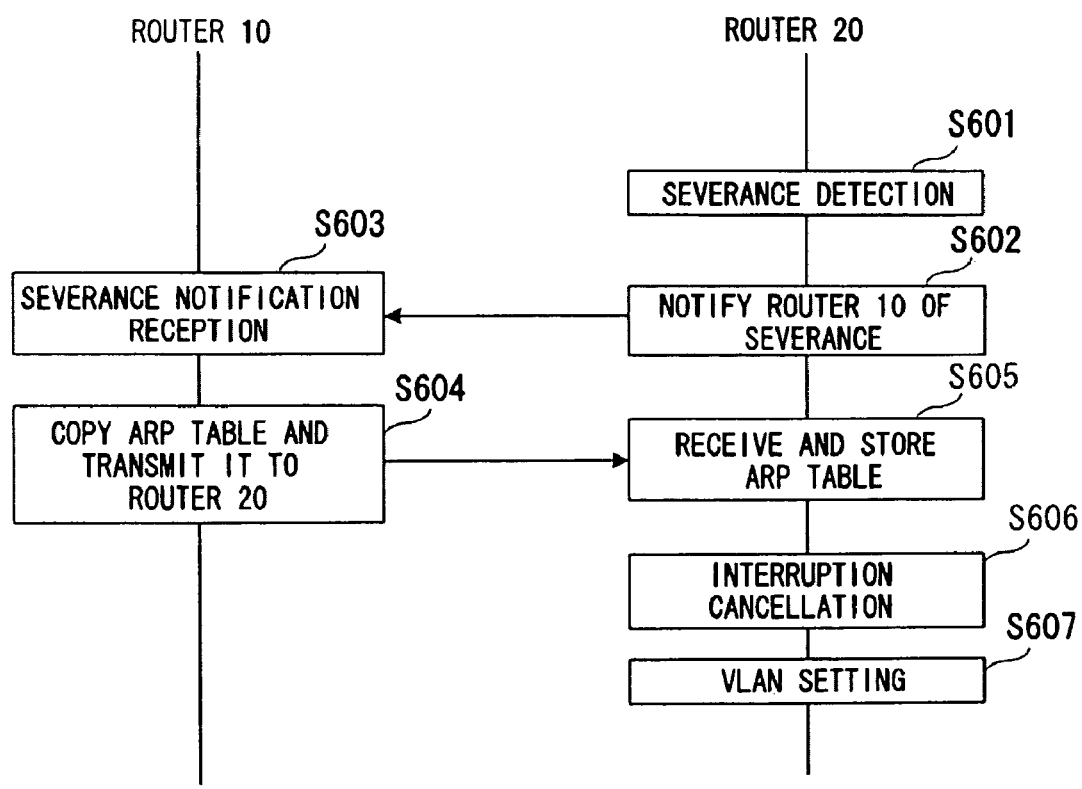
FIG. 6 is a sequence diagram for illustrating a process from a severance detection to a VLAN setting.
Figure 7:
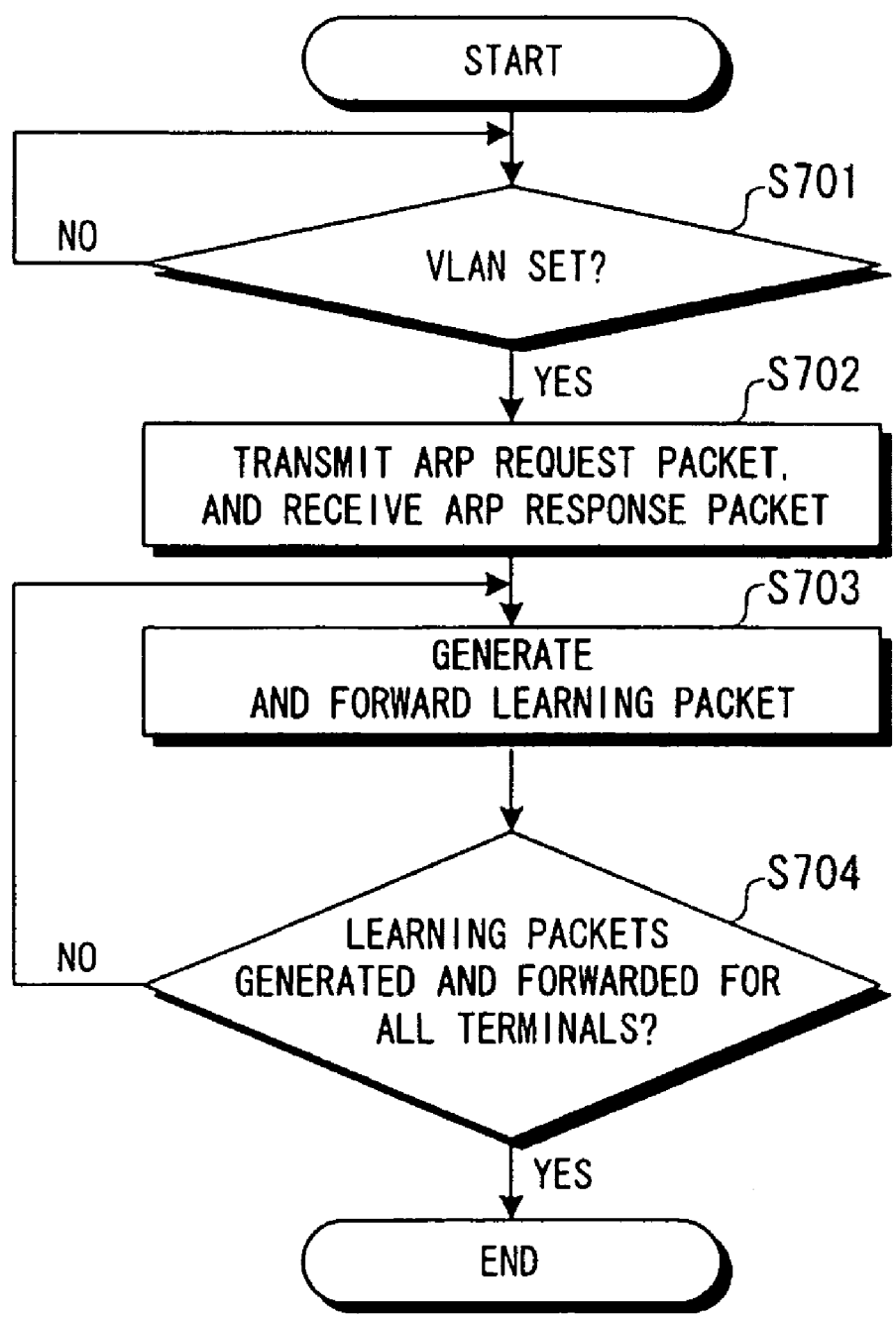
FIG. 7 is a diagram for illustrating a process of the router after the VLAN setting in the embodiment 1.

Next, a description will be given, using FIGS. 6 and 7, of a process of the router in the embodiment 1. FIG. 6 is a sequence diagram for illustrating a process from the severance detection to the VLAN setting, and FIG. 7 is a diagram for illustrating a process of the router after the VLAN setting in the embodiment 1.

Procedure of Process from Severance Detection to VLAN Setting

Firstly, the router 20 in the embodiment 1, on detecting a severance within the subnet (step S601), notifies the router 10 of the severance (step S602). For example, when a failure occurs between the L2SW 200_4 and the L2SW 200_2, causing a severance within the subnet 400_1, as shown in FIG. 2A, as a condition continues in which the packet transmission/reception unit 20*a* does not receive the monitoring packet from the packet transmission/reception unit 10*a*, the severance detection unit 20*e* detects the severance within the subnet 400_1, and transmits a packet for notifying the router 10 that the severance has been caused within the subnet 400_1, from the packet transmission/reception unit 20*a* via the backbone network 100 to the packet transmission/reception unit 10*a*.

Then, when the router 10 in the embodiment 1 receives the severance notification from the router 20 (step S603), the redundant function control unit 10*c* copies the ARP table 10*g*, and transmits it to the router 20 (step S604).

Continuing, the router 20 in the embodiment 1, on receiving the copied ARP table 10*g*, stores contents thereof in the ARP table 20*g* (step S605).

At the same time, the router 20 in the embodiment 1 resumes the interrupted communication with the backbone network 100 and the subnet 400_1 (step S606).

Then, the router 20 in the embodiment 1 sets the VLAN, set in the subnet 400_1, for the backbone network 100 too (step S607). That is, the connection control unit 20*f* sets the VID of the VLAN, heretofore set in the subnet 400_1, for the backbone network 100 too, as shown in FIG. 2B, and establishes the "backbone network route" which connects the router 10 and the router 20 on the layer 2 by means of the backbone network 100, in addition to the "intra-subnet route". Procedure of Process of Router after VLAN Setting Firstly, in the router 10 in the embodiment 1, when the VLAN is set for the backbone network 100 (step S701 affirmative), the packet transmission/reception unit 10*a* transmits an ARP request packet, which requests an MAC address for an IP address of each of the plurality of terminals included in the ARP table 10*g*, to the intra-subnet route and the backbone network route, and receives an ARP response packet, which has the MAC address of the terminal as the transmission source, from the terminal by means of the intra-subnet route or the backbone network route (step S702).

For example, the packet transmission/reception unit 10*a* transmits the kind of ARP request packet shown in FIG. 4A to the terminal 300_1, and receives the kind of ARP response packet shown in FIG. 4C from the terminal 300_1. Also, the packet transmission/reception unit 10*a* transmits the kind of ARP request packet shown in FIG. 4B to the terminal 300_2, and receives the kind of ARP response packet shown in FIG. 4D from the terminal 300_2.

Then, the ARP response forwarding unit 10*d* generates a learning packet having an MAC address of a terminal, stored in the received ARP response packet, as the transmission source, and forwards it to a route, a reversal of a route by means of which the ARP response packet has been received (step S703). For example, when the packet transmission/reception unit 10*a* receives the ARP response packet shown in FIG. 4C from the terminal 300_1 by means of the intra-subnet route, the ARP response forwarding unit 10*d* generates a packet, which has the address of the ARP response packet changed to the broadcast, as the learning packet. Specifically, it generates a learning packet having "MAC-DA: BC", as shown in FIG. 5A. Then, the ARP response forwarding unit 10*d*, via the packet transmission/reception unit 10*a*, transmits the learning packet to the broadcast by way of the backbone network route.

By this means, the L2SW 200_2 relearns that the terminal 300_1 exists in the right direction, together with "MAC address: MAC (300_1)" of the terminal 300_1, and the L2SW 200_3 relearns that the terminal 300_1 exists in the up direction, together with "MAC address: MAC (300_1)" of the terminal 300_1 (refer to FIG. 2C-5-1). A relearning of the terminal 300_2 by the layer 2 switch is carried out according to the same procedure.

Continuing, when the ARP response forwarding unit 10*d*, on generating learning packets of all the terminals included in the ARP table 10*g*, and forwarding them (step S704 affirmative), finishes the process.

Advantage of Embodiment 1

As heretofore described, according to the embodiment 1, an existence or otherwise of a severance within the subnet 400_1 is detected and, in the event that the severance within the subnet 400_1 has been detected, as well as the interrupted communication between the router 20, which is the backup router, and the backbone network 100 and the subnet 400_1 being resumed, the ARP table 10*g* stored by the router 10 which is the master router is stored in the ARP table 20*g* of the router 20, a control is carried out in such a way as to cause the router 20 to make the transition to the redundant master router, the VLAN set in the subnet 400_1 is also set for the backbone network 100, the router 10, which is the master router, and the router 20, which functions as the redundant master router, are connected on the layer 2 by means of the backbone network 100. An ARP request packet for an IP address of each of the plurality of terminals included in the ARP table 10g is transmitted to the intra-subnet route and the backbone network route, an ARP response packet having the MAC address of the terminal as the transmission source is received from the terminal by means of the intra-subnet route or the backbone network route, and a learning packet having an MAC address of a terminal, stored in the received ARP response packet, as the transmission source is generated, and forwarded to a route, a reversal of a route by means of which the ARP response packet has been received. Therefore, using the backbone network route connected on the layer 2, the layer 2 switches, which cannot relearn the MAC addresses by means of one route, can relearn the MAC addresses by means of the reverse route, enabling the efficient relearning of the MAC addresses. Also, with the efficient relearning shortening the communication severance time period during the severance, it is possible to realize a highly reliable network.

Also, according to the embodiment 1, as a packet having the address of the ARP response packet changed to the broadcast is generated as the learning packet, it is possible to reduce a load on the CPU, enabling a more efficient relearning of the MAC addresses.

Although a description has been given, in the heretofore described embodiment 1, of a case of causing the layer 2 switch to relearn the MAC address during the severance within the subnet, a description will be given, in the embodiment 2, of a case of causing the layer 2 switch to relearn the MAC address during a fixing of the severance within the subnet.

Outline and Features of Router in Embodiment 2

Firstly, a specific description will be given, using FIGS. 8A to 8C, of main features of a router in the embodiment 2. FIGS. 8A to 8C are diagrams for illustrating an outline and features of the router in the embodiment 2.

The router in the embodiment 2 detects a fixing of the severance within the subnet. For example, the router 20 which has made the transition to the redundant master router, by receiving the monitoring packet again from the router 10, which is the master router, at the regular time intervals, detects a fixing of the severance within the subnet 400_1 (refer to FIG. 8A-Box 1). At this time, the router 10 which is the master router also, by receiving the monitoring packet from the router 20, which has made the transition to the redundant master router, at the regular time intervals, detects the fixing of the severance within the subnet 400_1.

Then, the router in the embodiment 2, in the event that the severance within the subnet has been fixed, cancels the VLAN set for the backbone network 100 (refer to FIG. 8A-Box 2). That is, it cancels the VID set between the router 10, which is the master router, and the router 20, which functions as the redundant master router, and cancels the layer 2 connection between the router 10 and the router 20.

Then, the router in the embodiment 2 interrupts the communication between the router 20 and the backbone network 100 and subnet 400_1, and carries out a control in such a way as to cause the router 20 to make a transition from the redundant master router to the backup router (refer to FIG. 8A-3).

Then, the router in the embodiment 2 transmits a packet, which has the MAC address of the router 20 as the transmission source, from the router 20, which is the backup router, to the router 10, which is the master router, by means of the intra-subnet route (refer to FIG. 8B-4). That is, it transmits a packet, in which the transmission source MAC address is "MAC (router 20)", from the router 20 which is the backup router to the router 10 by means of the intra-subnet route. As the packet, it is also acceptable to arrange in such a way that a monitoring packet (for example, the BPDU) of which the transmission from the router 20 is interrupted can be used only in this case.

By this means, the L2SW's 200_1 to 200_4, which are the layer 2 switches contained in the subnet, relearn the MAC address (MAC (router 20)), which functions as the backup router, and a direction in which the router 20 is connected. That is, the L2SW 200_1, L2SW 200_4 and L2SW 200_2 relearn that the router 20 is connected in a right direction, and the L2SW 200_3 relearns that the router 20 is connected in an up direction.

Then, the router in the embodiment 2 transmits an ARP request packet, which requests an MAC address for an IP address of each of the plurality of terminals included in the ARP table, from the router 10 which is the master router to the intra-subnet route, and receives an ARP response packet, which has the MAC address of the terminal as the transmission source, from the terminal by means of the intra-subnet route (refer to FIG. 8B-5).

Specifically, the router 10 transmits an ARP request packet, which requests the MAC address of the terminal 300_1, to the intra-subnet route at the IP address (IP (300_1)) of the terminal 300_1 included in the ARP table, and receives the ARP response packet, which stores "MAC address: MAC (300_1)", from the terminal 300_1 by means of the intra-subnet route (refer to FIG. 8B-(5-1)). However, by this means, details of learning of the MAC addresses by the layer 2 switches during the severance, shown in FIG. 8A, are not changed.

Also, the router 10 transmits an ARP request packet, which requests the MAC address of the terminal 300_2, to the intra-subnet route at the IP address (IP (300_2)) of the terminal 300_2 included in the ARP table, and receives an ARP response packet, which stores "MAC address: MAC (300_2)", from the terminal 300_2 by means of the intra-subnet route (refer to FIG. 8B-(5-2)). By this means, the details of learning of the MAC addresses by the layer 2 switches during the severance, shown in FIG. 8A, are changed as shown in FIG. 8B-(5-2). That is, the L2SW 200_1 and the L2SW 200_4 relearn that the terminal 300_2 is connected in the right direction.

Then, the router in the embodiment 2 again transmits the ARP request packet having the MAC address of the router 20, which is the backup router, as the transmission source, from the master router to the plurality of terminals, and forwards the ARP response packets having the MAC addresses of the terminals as the transmission sources, from the terminals to the router 20, which is the backup router, by means of the intra-subnet route (refer to FIGS. 8C, (6-1) and (6-2)).

Specifically, as shown in FIG. 8C-(6-1), the ARP request packet is transmitted again from the router 10 to the terminal 300_1, with the MAC address of the router 20, which is the backup router, as the transmission source. The terminal 300_1 transmits the ARP response packet to the router 20 which is the transmission source, and the router 20 receives the ARP response packet from the terminal 300_1. By this means, as shown in FIG. 8C-(6-2), the L2SW 200_2 and the L2SW 200_3 relearn that the terminal 300_1 is connected in the left direction. By this means, as shown in FIG. 1, the normal details of learning of the MAC addresses by the layer 2 switches are restored.

Also, as shown in FIG. 8C-6-2, the ARP request packet is transmitted again from the router 10 to the terminal 300_2, with the MAC address of the router 20, which is the backup router, as the transmission source. The terminal 300_2 transmits the ARP response packet to the router 20 which is the transmission source, and the router 20 receives the ARP response packet from the terminal 300_2. However, in the embodiment, by this means, the details of learning of the MAC addresses by the layer 2 switches are not changed.

With this kind of configuration, in the router in the embodiment 2, it is possible to shorten a time period required to relearn the MAC addresses, enabling a more efficient relearning of the MAC addresses.

Configuration of Router in Embodiment 2

Next, a description will be given, using FIGS. 3 and 9A to 9D, of the router in the embodiment 2. FIG. 3 is the block diagram showing the configuration of the router in the embodiment 1, and FIGS. 9A to 9D are diagrams for illustrating an ARP response forwarding unit in the embodiment 2.

Although the router 10 and router 20 in the embodiment 2 have the same configurations as the router 10 and router 20 in the embodiment 1, as shown in FIG. 3, the processing details differ between the packet transmission/reception 10*a*, redundant function control unit 10*c*, ARP response forwarding unit 10*d*, severance detection unit 10*e* and connection control unit 10*f*, which configure the router 10, and the packet transmission/reception unit 20*a*, redundant function control unit 20*c*, ARP response forwarding unit 20*d*, severance detection unit 20*e* and connection control unit 20*f*, which configure the router 20. Hereafter, a description will be given, centered on this.

The severance detection unit 10*e* and the severance detection unit 20*e* detect a fixing of the severance within the subnet. For example, when the packet transmission/reception unit 20*a* of the router 20, which has made the transition to the redundant master router, receives the monitoring packet again from the router 10, which is the master router, at the regular time intervals, the severance detection unit 20*e* detects a fixing of the severance within the subnet 400_1 (refer to FIG. 8A-1). At this time, by the packet transmission/reception unit 10*a* of the router 10, which is the master router, receiving the monitoring packet from the router 20, which has made the transition to the redundant master router, at the regular time intervals, the severance detection unit 10*e* also detects the fixing of the severance within the subnet 400_1.

The connection control unit 10*f* and the connection control unit 20*f*, in the event that the severance within the subnet has been fixed, cancel the VLAN set for the backbone network 100 (refer to FIG. 8A-B*ox* 2). That is, they cancel the VID set between the router 10, which is the master router, and the router 20, which functions as the redundant master router, and cancel the layer 2 connection between the router 10 and the router 20. Herein, it is also acceptable that the connection control unit 10*f*, based on the severance fixing detected by the severance detection unit 10*e*, cancels the VLAN set for the backbone network 100, or that the connection control unit 20*f*, based on the severance fixing detected by the severance detection unit 20*e*, cancels the VLAN set for the backbone network 100.

The redundant function control unit 20*c* of the router 20, based on the severance fixing detected by the severance detection unit 20*e*, interrupts the communication between the router 20 and the backbone network 100 and subnet 400_1, and carries out a control in such a way as to cause the router 20 to make the transition from the redundant master router to the backup router (refer to FIG. 8A-B*ox* 3).

The packet transmission/reception unit 20*a* of the router 20 transmits a packet, which has the MAC address of the router 20 as the transmission source, from the router 20, which is the backup router, to the router 10, which is the master router, by means of the intra-subnet route (refer to FIG. 8B-B*ox* 4). That is, it transmits a packet, in which the transmission source MAC address is "MAC (router 20)", from the router 20 which is the backup router to the router 10 by means of the intra-subnet route. By this means, the L2SW's 200_1 to 200_4, which are the layer 2 switches contained in the subnet, relearn the MAC address of the router 20, which is the backup router, and a direction in which the router 20 is connected.

The packet transmission/reception unit 10*a* of the router 10 transmits an ARP request packet, which requests an MAC address for an IP address of each of the plurality of terminals stored in the ARP table 10*g*, to the intra-subnet route, and receives an ARP response packet, which has the MAC address of the terminal as the transmission source, from the terminal by means of the intra-subnet route (refer to FIG. 5B-B*ox* 5).

Specifically, the packet transmission/reception unit 10*a* transmits the ARP request packet shown in FIG. 4A to the IP address (IP (300_1)) of the terminal 300_1 included in the ARP table, and receives the ARP response packet shown in FIG. 4C, transmitted by the terminal 300_1.

Also, the packet transmission/reception unit 10*a* transmits the ARP request packet shown in FIG. 4B to the IP address (IP (300_2)) included in the ARP table, and receives the ARP response packet shown in FIG. 4D, transmitted by the terminal 300_2. By this means, the details of learning of the MAC addresses by the layer 2 switches during the severance, shown in FIG. 8A, are changed as shown in FIG. 8B-(5-2). That is, the L2SW 200_1 and the L2SW 200_4 relearn that the terminal 300_2 is connected in the right direction.

The ARP response forwarding unit 10*d* of the router 10 again transmits an ARP request packet having the MAC address of the router 20, which is the backup router, as the transmission source, from the master router to the plurality of terminals, and forwards ARP response packets having the MAC addresses of the terminals as the transmission sources, from the terminals to the router 20, which is the backup router, by means of the intra-subnet route (refer to FIGS. 8C, (6-1) and (6-2)).

Specifically, as shown in FIG. 9A, the MAC address and IP address of the router 20 which is the backup router are stored in "ARP request" as the transmission source of the ARP response packet, and an ARP request packet having "MAC-SA: MAC (router 10)" as the transmission source MAC address is transmitted again to the terminal 300_1. Then, the terminal 300_1 transmits an ARP response packet, which has the MAC address of the router 20 as the transmission source, to the router 20, as shown in FIG. 9C, and the packet transmission/reception unit 20*a* receives the ARP response packet from the terminal 300_1. By this means, as shown in FIG. 8C-(6-2), the L2SW 200_2 and the L2SW 200_3 relearn that the terminal 300_1 is connected in the left direction. By this means, as shown in FIG. 1, the normal details of learning of the MAC addresses by the layer 2 switches are restored.

Also, as shown in FIG. 9B, the MAC address and IP address of the router 20 which is the backup router are stored in "ARP request" as the transmission source of the ARP response packet, and an ARP request packet having the transmission source MAC address as "MAC-SA: MAC (router 10)" is transmitted again to the terminal 300_2. Then, the terminal 300_2 transmits an ARP response packet, which has the MAC address of the router 20 as the transmission source, to the router 20, and the packet transmission/reception unit 20*a* receives the ARP response packet from the terminal 300_2.

Procedure of Process of Router in Embodiment 2

Figure 10:
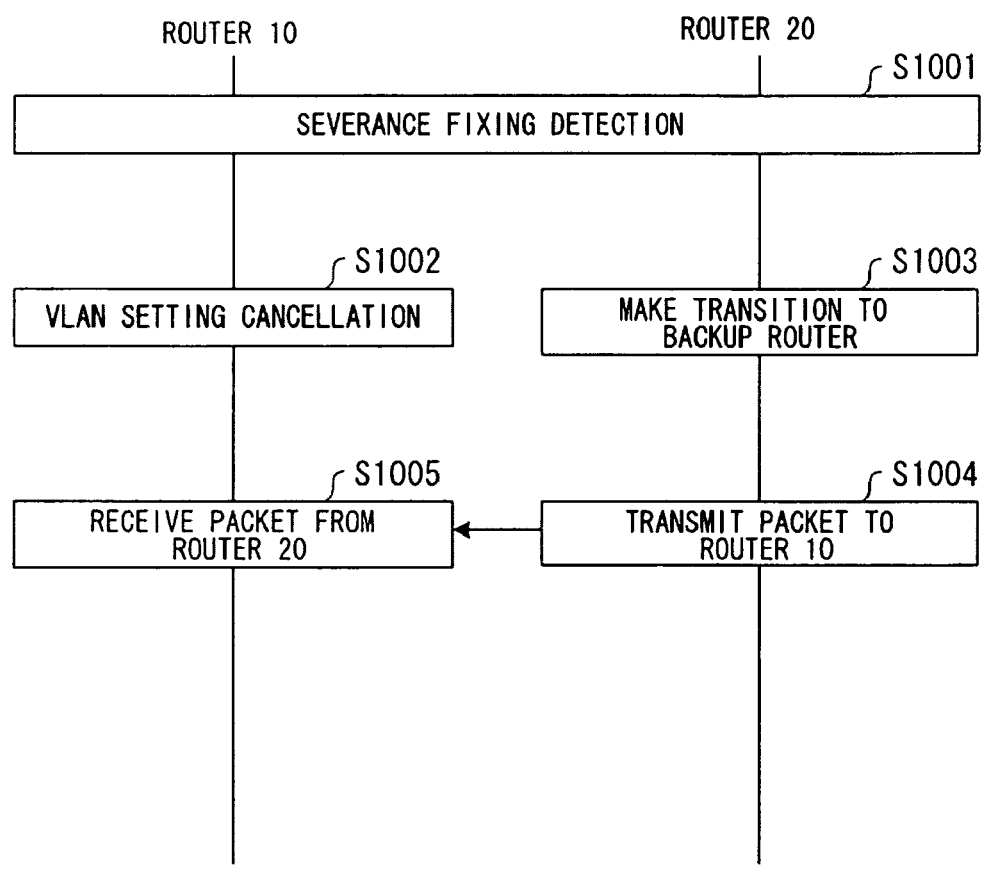
FIG. 10 is a diagram for illustrating a process from a severance fixing detection to a reception of a packet from a backup router.
Figure 11:
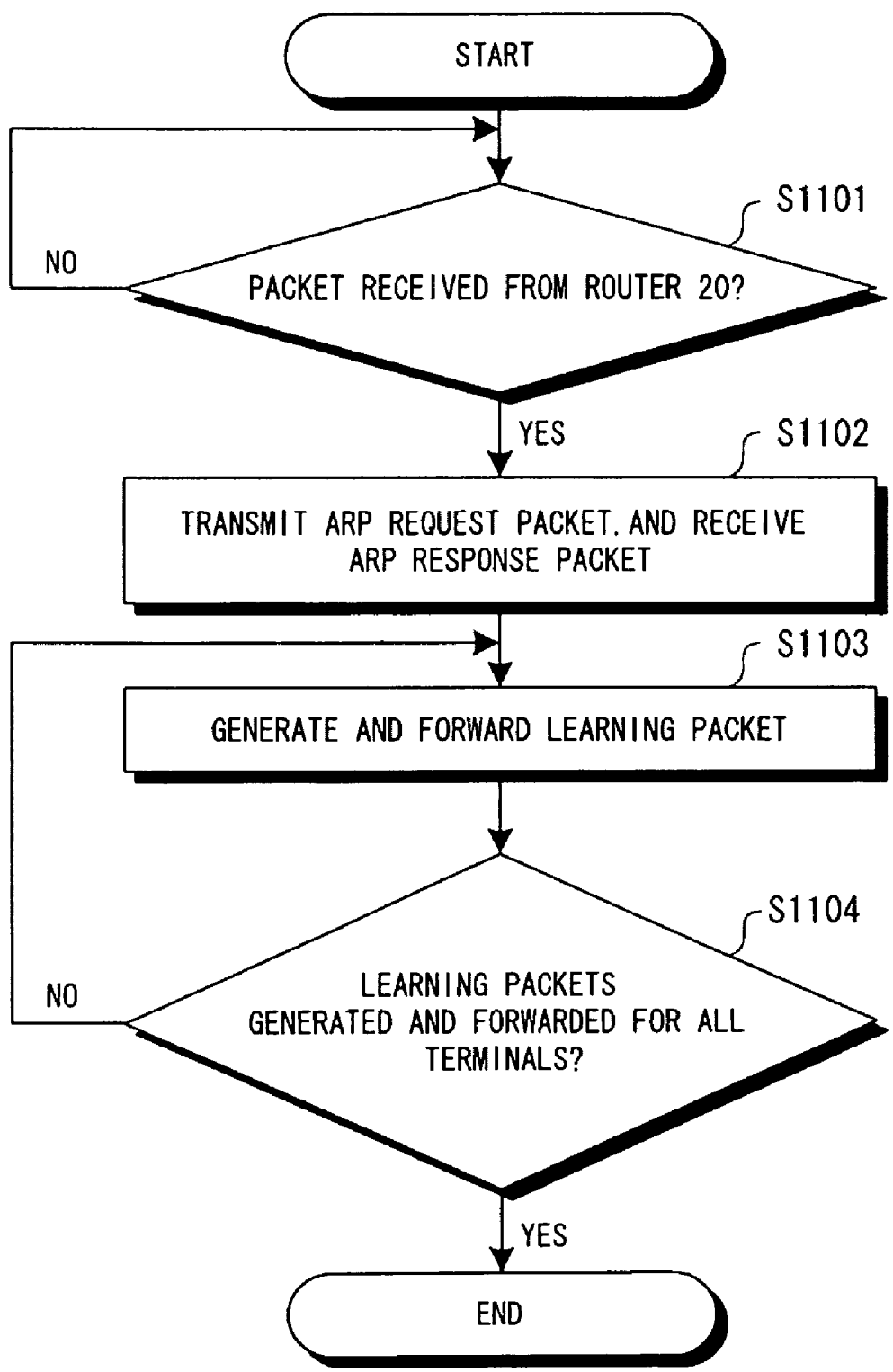
FIG. 11 is a diagram for illustrating a process of a router after the packet reception from the backup router in the embodiment 2.

Next, a description will be given, using FIGS. 10 and 11, of a process of the router in the embodiment 2. FIG. 10 is a diagram for illustrating a process from a severance fixing detection to a reception of a packet from the backup router, and FIG. 11 is a diagram for illustrating a process of the router after the reception of the packet from the backup router in the embodiment 2.

Procedure of Process from Severance Fixing Detection to Packet Reception from Backup Router Firstly, when the router 10 and router 20 in the embodiment 2 detect a fixing of the severance within the subnet (step S1001), the connection control unit 10f cancels the VLAN set for the backbone network 100 (step S1002). For example, when the packet transmission/reception unit 10a of the router 10 receives the monitoring packet from the router 20, which is the redundant master router, at the regular time intervals, the severance detection unit 10e detects the fixing of the severance within the subnet 400_1, the connection control unit 10f cancels the VID set between the router 10, which is the master router, and the router 20, which functions as the redundant master router, and cancels the layer 2 connection between the router 10 and the router 20.

Then, the redundant function control unit 20c of the router 20, based on the severance fixing detected by the severance detection unit 20e, interrupts the communication between the router 20 and the backbone network 100 and subnet 400_1, and carries out a control in such a way as to cause the router 20 to make the transition from the redundant master router to the backup router (step S1003, refer to FIG. 8A-Box 3).

Continuing, the packet transmission/reception unit 20a of the router 20 transmits a packet, which has the MAC address of the router 20 as the transmission source, from the router 20, which is the backup router, to the router 10, which is the master router, by means of the intra-subnet route (step S1004, refer to FIG. 8B-Box 4), and the packet transmission/reception unit 10a of the router 10 receives the packet (step S1005).

Herein, by a packet having "MAC (router 20)" as the transmission source MAC address being transmitted from the router 20, which is the backup router, to the router 10 by means of the intra-subnet route, the L2SW's 200_1 to 200_4 which are the layer 2 switches contained in the subnet relearn the MAC address (MAC (router 20)) of the router 20, which functions as the backup router, and a direction in which the router 20 is connected. That is, the L2SW 200_1, L2SW 200_4 and L2SW 200_2 relearn that the router 20 is connected in the right direction, and the L2SW 200_3 relearns that the router 20 is connected in the up direction.

Process of Router after Packet Reception from Backup Router

Firstly, when the router 10 in the embodiment 2 receives a packet, which has the MAC address of the router 20 as the transmission source, from the router 20 which is the backup router, (step S1101 affirmative), the packet transmission/reception unit 10a of the router 10 transmits an ARP request packet, which requests an MAC address for an IP address of each of the plurality of terminals stored in the ARP table 10g, to the intra-subnet route, and receives an ARP response packet, which has the MAC address of the terminal as the transmission source, from the terminal by means of the intra-subnet route (step S1102).

For example, the packet transmission/reception unit 10a transmits the ARP request packet shown in FIG. 4B to the IP address (IP (300_2)) of the terminal 300_2 included in the ARP table, and receives the ARP response packet shown in FIG. 4D, transmitted by the terminal 300_2. By this means, the details of learning of the MAC addresses by the layer 2 switches during the severance, shown in FIG. 8A, are changed as shown in FIG. 8B-(5-2). That is, the L2SW 200_1 and the L2SW 200_4 relearn that the terminal 300_2 is connected in the right direction.

Then, the ARP response forwarding unit 10d again transmits an ARP request packet, which has the MAC address of the router 20 which is the backup router as the transmission source, as the learning packet from the master router to the plurality of terminals, and forwards ARP response packets having the MAC addresses of the terminals as the transmission sources from the terminals to the router 20, which is the backup router, by means of the intra-subnet route (step S1103).

For example, as shown in FIG. 9A, the MAC address and IP address of the router 20 which is the backup router are stored in "ARP request" as the transmission source of the ARP response packet, and the ARP request packet having "MAC-SA: MAC (router 10)" as the transmission source MAC address is transmitted again to the terminal 300_1. The terminal 300_1 transmits the ARP response packet, which has the MAC address of the router 20 as the transmission destination, to the router 20, as shown in FIG. 9C, and the packet transmission/reception unit 20a receives the ARP response packet from the terminal 300_1. By this means, as shown in FIG. 8B-(6-2), the L2SW 200_2 and the L2SW 200_3 relearn that the terminal 300_1 is connected in the left direction. This way, as shown in FIG. 1, the normal details of learning of the MAC addresses by the layer 2 switches are restored.

Continuing, the ARP response forwarding unit 10d, on again transmitting the ARP request packet having the MAC address of the router 20, which is the backup router, as the transmission source, to all the terminals included in the ARP table 10g, as the learning packet (step S1104 affirmative), finishes the process.

Advantage of Embodiment 2

As heretofore described, according to the embodiment 2, in the event that the fixing of the severance within the subnet 400_1 has been detected, the VLAN set for the backbone network 100 is cancelled, the communication between the router 20, which is the redundant master router, and the backbone network 100 and subnet 400_1 is interrupted, a control is carried out in such a way as to make the transition from the redundant master router to the backup router. A packet having the MAC address of the router 20, which is the backup router, as the transmission source, is transmitted from the router 20 to the router 10, which is the master router, by means of the intra-subnet route. An ARP request packet which requests an MAC address for an IP address of each of the plurality of terminals included in the ARP table is transmitted from the router 10 which is the master router to the intra-subnet route, and an ARP response packet, which has the MAC address of the terminal as the transmission source, is received from the terminal by means of the intra-subnet route. The received ARP request packet having the router 20, which is the backup router, as the transmission source, is transmitted again from the router 10, which is the master router, to the plurality of terminals, and ARP response packets, which have the MAC addresses of the terminals as the transmission sources, are forwarded from the terminals to the backup router by means of the intra-subnet route. Therefore, it is possible to relearn the MAC addresses only by means of the intra-subnet route, enabling the efficient relearning of the MAC addresses. Also, the efficient relearning shortens the communication severance time period during the severance fixing, it is possible to realize the highly reliable network.

Embodiment 3

Although a description has been given, in the heretofore described embodiment 1, of a case in which a single router causes the layer 2 switches to relearn the MAC addresses, a description will be given, in the embodiment 3, of a case in which a plurality of routers configured redundantly share in causing the layer 2 switches to relearn the MAC addresses during the severance within the subnet.

Outline and Features of Router in Embodiment 3

Figure 12:
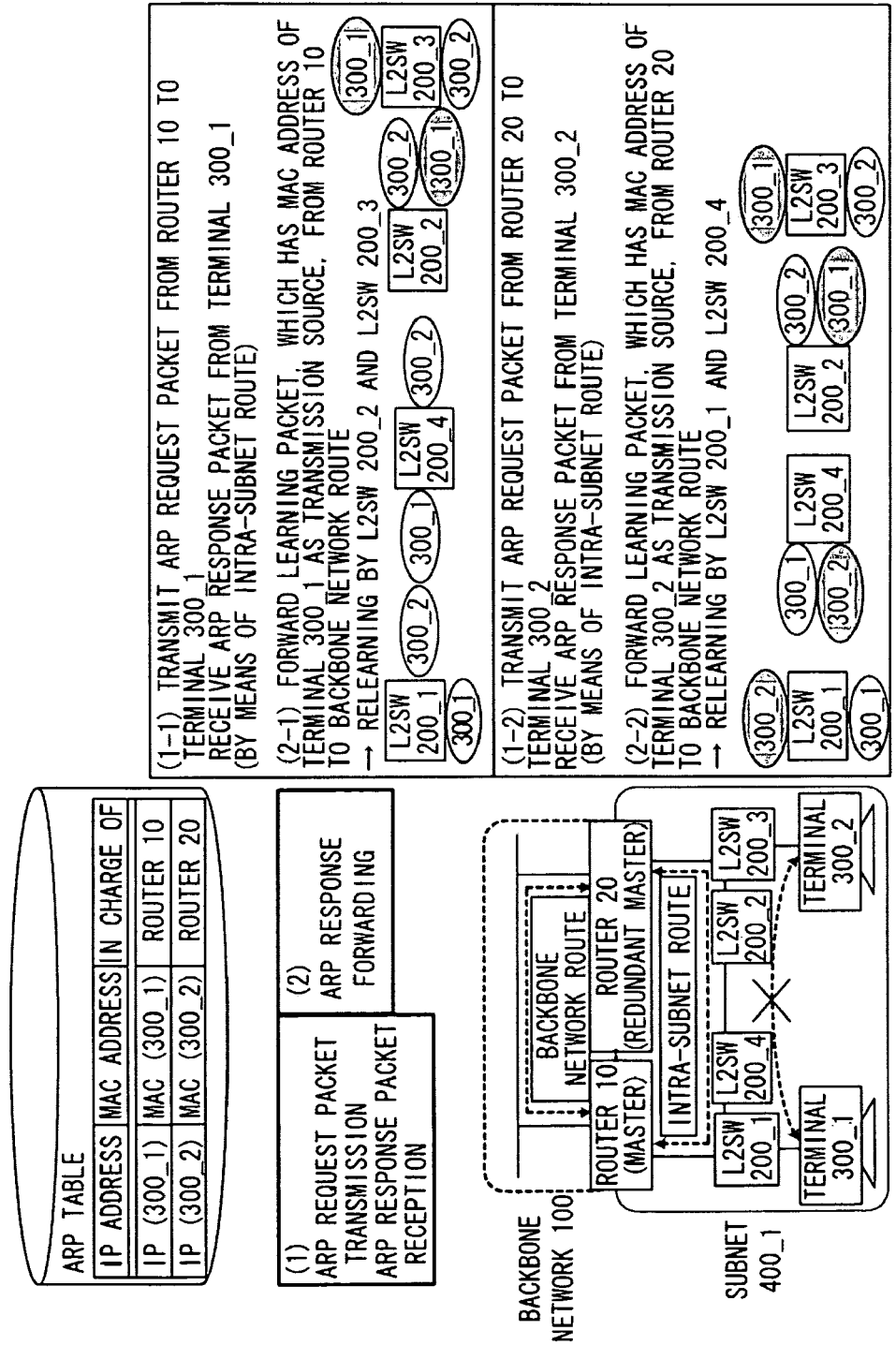
FIG. 12 is a diagram for illustrating an outline and features of a router in an embodiment 3.

Firstly, a specific description will be given, using FIG. 12, of main features of a router in the embodiment 3. FIG. 12 is a diagram for illustrating an outline and features of the router in the embodiment 3.

In the router in the embodiment 3, during the severance within the subnet, the router 10, which is the master router, and the router 20, which has made the transition from the backup router to the redundant master router, share the IP addresses of the plurality of terminals included in the ARP table, and transmit ARP request packets.

Herein, the ARP table stored by the router 10, which is the master router, further includes in advance an item "in charge of" indicating, for each of the plurality of terminals, which router transmits an ARP request packet when a severance occurs. For example, as shown in FIG. 12, the ARP table includes advance information when the router 10 transmits an ARP request packet to the IP address (IP (300_1)) of the terminal 300_1, and the router 20 transmits an ARP request packet to the IP address (IP (300_2)) of the terminal 300_2.

That is, the router in the embodiment 3, referring to the heretofore described ARP table, transmits an ARP request packet to an IP address of a terminal in its charge, and receives an ARP response packet from the terminal (refer to FIG. 12-Box 1). Specifically, sharing the heretofore described ARP table, the router 10 transmits the ARP request packet to the IP address (IP (300_1)) of the terminal 300_1 in its charge by means of the broadcast, and receives the ARP response packet from the terminal 300_1 by means of the intra-subnet route (refer to FIG. 12-1-Box (1-1)), while the router 20 transmits the ARP request packet to the IP address (IP (300_2)) of the terminal 300_2 in its charge by means of the broadcast, and receives the ARP response packet from the terminal 300_2 by means of the intra-subnet route (refer to FIG. 12-Box (1-2)).

Then, in the router in the embodiment 3, the router 10, which is the master router, and the router 20, which has made the transition from the backup router to the redundant master router, generate learning packets having MAC addresses of the terminals stored in the received ARP response packets as transmission sources, and forward them to a route, a reversal of a route by means of which they have received the ARP response packets.

Specifically, the router 10, on receiving "MAC address: MAC (300__1)" from the terminal 300_1, generates a learning packet having "MAC address: MAC (300__1)" as the transmission source, and forwards it to the backbone network route. By this means, the L2SW 200_2 relearns that the terminal 300_1 exists in the right direction, together with "MAC address: MAC (300__1)" of the terminal 300_1, and the L2SW 200_3 relearns that the terminal 300_1 exists in the up direction, together with "MAC address: MAC (300__1)" of the terminal 300_1 (refer to FIG. 12-Box (2-1)).

In the same way as this, the router 20, on receiving "MAC address: MAC (300__2)" from the terminal 300_2, generates a learning packet having "MAC address: MAC (300__2)" as the transmission source, and forwards it to the backbone network route. By this means, the L2SW 200_1 relearns that the terminal 300_2 exists in the up direction, together with "MAC address: MAC (300__2)" of the terminal 300_2, and the L2SW 200_4 relearns that the terminal 300_2 exists in the left direction, together with "MAC address: MAC (300__2)" of the terminal 300_2 (refer to FIG. 12-1-2). FIG. 12-Box (1-2) shows details of the relearning due to the forwarding by the router 20, as well as details of the relearning due to the forwarding by the router 10.

With this kind of configuration, in the router in the embodiment 3, it is possible to shorten a time period required to relearn the MAC addresses, enabling a more efficient relearning of the MAC addresses.

Configuration of Router in Embodiment 3

Next, a description will be given, using FIGS. 3, 13A to 13D, and 14A and 14B, of the router in the embodiment 3. FIG. 3 is the block diagram showing the configuration of the router in the embodiment 1, FIGS. 13A to 13D are diagrams for illustrating a packet transmission/reception unit in the embodiment 3, and FIGS. 14A and 14B are diagrams for illustrating an ARP response forwarding unit in the embodiment 3.

Although the router 10 and router 20 in the embodiment 3 have the same configurations as the router 10 and router 20 in the embodiment 1, as shown in FIG. 3, contents stored by the ARP table 10g configuring the router 10 and by the ARP table 20g configuring the router 20 differ. Hereafter, a description will be given, centered on this.

The ARP table 10g of the router 10 further stores in advance an item "in charge of" indicating, for each of the plurality of terminals, which router transmits an ARP request packet when a severance occurs. For example, as shown in FIG. 12, the ARP table stores in advance the information so that, when the severance occurs, the router 10 transmits the ARP request packet to the IP address (IP (300_1)) of the terminal 300_1, and the router 20 transmits the ARP request packet to the IP address (IP (300_2)) of the terminal 300_2.

The ARP table 20g of the router 20 stores the "copied ARP table 10g" received by the router 20 after the severance detection unit 10e and the severance detection unit 20e detect a severance within the subnet 400_1.

The packet transmission/reception unit 10a transmits an ARP request packet, which requests an MAC address for an IP address of each of a plurality of terminals in its charge, which are stored by the ARP table 10g, and receives an ARP response packet, which has the MAC address of the terminal as the transmission source, from the terminal by means of the intra-subnet route or the backbone network route.

Specifically, the packet transmission/reception unit 10a, referring to the ARP table 10g, transmits an ARP request packet, in which the transmission destination is the broadcast (MAC-DA: BC), and the MAC address (MAC-SA) of the transmission source is "MAC (router 10)", as shown in FIG. 13A, to the IP address (IP (300_1)) of the terminal 300_1. Then, the packet transmission/reception unit 10a receives an ARP response packet, in which the transmission destination is the router 10 (MAC-DA: MAC (router 10)), and the MAC address of the terminal 300_1 is the transmission source (MAC-SA: MAC address: MAC (300_1)), as shown in FIG. 13C, by means of the intra-subnet route (refer to FIG. 12-(1-1)).

Also, the packet transmission/reception unit 20a transmits an ARP request packet, which requests an MAC address for an IP address of each of a plurality of terminals in its charge, stored by the ARP table 20g, to the intra-subnet route and the backbone network route, and receives an ARP response packet, which has the MAC address of the terminal as the transmission source, from the terminal by means of the intra-subnet route or the backbone network route.

Specifically, the packet transmission/reception unit 20a, referring to the ARP table 20g, transmits an ARP request packet, in which the transmission destination is the broadcast (MAC-DA: BC), and the MAC address (MAC-SA) of the transmission source is "MAC (router 20)", as shown in FIG. 13B, to the IP address (IP (300_2)) of the terminal 300_2. Then, the packet transmission/reception unit 20a receives an ARP response packet, in which the transmission destination is the router 20 (MAC-DA: MAC (router 20), and the MAC address of the terminal 300_2 is the transmission source (MAC-SA: MAC address: MAC (300_2)), as shown in FIG. 13D, by means of the intra-subnet route (refer to FIG. 12-(1-2)).

The ARP response forwarding unit 10d generates a learning packet having an MAC address of a terminal stored in the received ARP response packet as the transmission source, and forwards it to a route, a reversal of a route by means of which the ARP response packet has been received. Specifically, when the packet transmission/reception unit 10a receives the ARP response packet shown in FIG. 13C from the terminal 300_1 by means of the intra-subnet route, the ARP response forwarding unit 10d generates a packet, which has the address of the ARP response packet changed to the broadcast, as the learning packet. Specifically, it generates a learning packet having "MAC-DA: BC", as shown in FIG. 14A. Then, the ARP response forwarding unit 10d, via the packet transmission/reception unit 10a, transmits the learning packet to the broadcast by way of the backbone network route. By this means, the L2SW 200_2 relearns that the terminal 300_1 exists in the right direction, together with "MAC address: MAC (300_1)" of the terminal 300_1, and the L2SW 200_3 relearns that the terminal 300_1 exists in the up direction, together with "MAC address: MAC (300_1)" of the terminal 300_1 (refer to FIG. 12-(2-1))

Also, when the packet transmission/reception unit 20a receives the ARP response packet shown in FIG. 13D from the terminal 300_2 by means of the intra-subnet route, the ARP response forwarding unit 20d generates a packet, which has the address of the ARP response packet changed to the broadcast, as the learning packet. Specifically, it generates a learning packet addressed to "MAC-DA: BC", as shown in FIG. 14B. Then, the ARP response forwarding unit 20d, via the packet transmission/reception unit 20a, transmits the learning packet to the broadcast by way of the backbone network route. By this means, the L2SW 200_1 relearns that the terminal 300_2 exists in the up direction, together with "MAC address: MAC (300_2)" of the terminal 300_2, and the L2SW 200_4 relearns that the terminal 300_2 exists in the left direction, together with "MAC address: MAC (300_2)" of the terminal 300_2 (refer to FIG. 12-(2-2)).

Procedure of Process of Router in Embodiment 3

Figure 15:
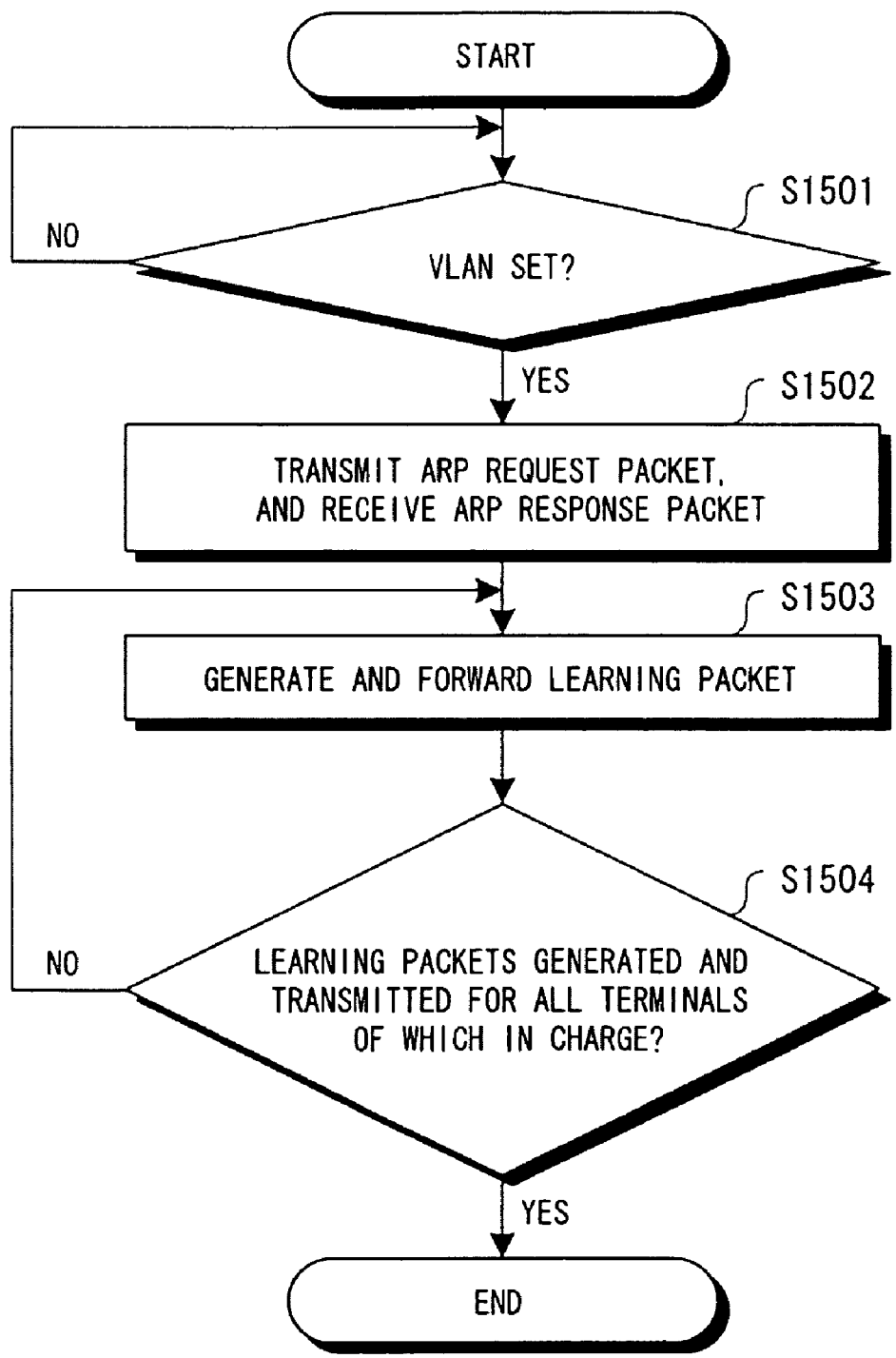
FIG. 15 is a diagram for illustrating a process of the router after a VLAN setting in the embodiment 3.

Next, a description will be given, using FIG. 15, of a process of the router in the embodiment 3. FIG. 15 is a diagram for illustrating a process of the router after the VLAN setting in the embodiment 3. As a procedure of a process from the severance detection to the VLAN setting is the same as the procedure of the process heretofore described using FIG. 6, a repetitive description will be omitted.

Procedure of Process of Router after VLAN Setting

Firstly, in the router 10 and router 20 in the embodiment 3, when the VLAN is set for the backbone network 100 (step S1501 affirmative), each of the packet transmission/reception unit 10a and the packet transmission/reception unit 20a, referring respectively to the ARP table 10g and the ARP table 20g, transmits an ARP request packet, which requests an MAC address for an IP address of each of a plurality of terminals shared, to the intra-subnet route and the backbone network route, and receives an ARP response packet, which has the MAC address of the terminal as the transmission source, from the terminal by means of the intra-subnet route or the backbone network route (step S1502).

For example, the packet transmission/reception unit 10a transmits the kind of ARP request packet shown in FIG. 13A to the terminal 300_1 in charge of the router 10, and receives the kind of ARP response packet shown in FIG. 13C from the terminal 300_1. Also, the packet transmission/reception unit 20a transmits the kind of ARP request packet shown in FIG. 13B to the terminal 300_2 in charge of the router 20, and receives the kind of ARP response packet shown in FIG. 13D from the terminal 300_2.

Then, each of the ARP response forwarding unit 10d and the ARP response forwarding unit 20d generates a learning packet having an MAC address of a terminal stored in the received ARP response packet as the transmission source, and forwards it to a route, a reversal of a route by means of which the ARP response packet has been received (step S1503). For example, when the packet transmission/reception unit 10a receives the ARP response packet shown in FIG. 13C from the terminal 300_1 by means of the intra-subnet route, the ARP response forwarding unit 10d generates a packet, which has the address of the ARP response packet changed to the broadcast, as the learning packet. Specifically, it generates a learning packet addressed to "MAC-DA: BC", as shown in FIG. 14A. Then, the ARP response forwarding unit 10d, via the packet transmission/reception unit 10a, transmits the learning packet to the broadcast by way of the backbone network route.

By this means, the L2SW 200_2 relearns that the terminal 300_1 exists in the right direction, together with "MAC address: MAC (300_1)" of the terminal 300_1, and the L2SW 200_3 relearns that the terminal 300_1 exists in the up direction, together with "MAC address: MAC (300_1)" of the terminal 300_1 (refer to FIG. 12-(2-1)).

Also, when the packet transmission/reception unit 20a receives the ARP response packet shown in FIG. 13D from the terminal 300_2 by means of the intra-subnet route, the ARP response forwarding unit 20d generates a packet, which has the address of the ARP response packet changed to the broadcast, as the learning packet. Specifically, it generates a learning packet addressed to "MAC-DA: BC", as shown in FIG. 14B. Then, the ARP response forwarding unit 20d, via the packet transmission/reception unit 20a, transmits the learning packet to the broadcast by way of the backbone network route.

By this means, the L2SW 200_1 relearns that the terminal 300_2 exists in the up direction, together with "MAC address: MAC (300_2)" of the terminal 300_2, and the L2SW 200_4 relearns that the terminal 300_2 exists in the left direction, together with "MAC address: MAC (300_2)" of the terminal 300_2 (refer to FIG. 12-(2-2)).

Continuing, the ARP response forwarding unit 10d and the ARP response forwarding unit 20d, on generating and forwarding learning packets for all the terminals in their charge included in the ARP table 10g and the ARP table 20g (step S1504 affirmative), finish the process.

Advantage of Embodiment 3

As heretofore described, according to the embodiment 3, the router 10, which is the master router, and the router 20, which has made the transition to the redundant master router, transmit ARP request packets, sharing the IP addresses of the plurality of terminals included in the ARP tables, generate learning packets having MAC addresses of terminals stored in received ARP response packets as transmission sources, and forward the ARP response packets to a route, a reversal of a route by means of which the ARP response packets have been received. Therefore, it is possible to shorten a time period required to relearn the MAC addresses, enabling a more efficient relearning of the MAC addresses.

Embodiment 4

Now, although the routers in the embodiments 1 to 3 have been described thus far, it is also acceptable that the invention is implemented in different aspects, apart from the heretofore described embodiments. Therein, hereafter, a description will be given, as a router in the embodiment 4, of different embodiments, divided into 1 to 4.

1. Transmission of ARP Request Packet

Although a description has been given, in the embodiment 3, of a case in which terminals shared for each router during the subnet severance are stored in the ARP table, the invention not being limited to this, a case is also acceptable in which a network manager dynamically sets the terminals shared for each router.

2. Learning Packet

Although a description has been given, in the embodiments 1 and 3, of a case of generating a packet having the address of the received ARP response packet changed to the broadcast, the invention not being limited to this, a case of generating a BPDU, which has a received terminal MAC address as the transmission source, as the learning packet is also acceptable. By this means, it is possible to use an existing function, enabling the efficient relearning of the MAC addresses.

3. System Configuration, etc.

It is also possible to manually carry out all or some of the processes, among the processes described in the heretofore described embodiments, which have been described as being automatically carried out (for example, to receive an ARP response packet transmission request from a keyboard or a touch panel, rather than transmitting an ARP response packet automatically when a severance occurs) and it is also possible to automatically carry out all or some of the processes, described as being manually carried out, by means of a heretofore known method. Apart from these, it is possible to optionally change the processing procedures, the specific appellations, and the information including various data and parameters (for example, the item "in charge of" in the ARP table), shown in the text and the figures, unless otherwise specified.

Also, the components of each apparatus shown in the figures, being functionally conceptual, do not necessarily have to be physically configured as shown in the figures. That is, specific aspects (for example, the aspect of FIG. 3) of a separation or integration of each processing unit and each storage unit not being limited to those shown in the figures, for example, it is possible to configure an aspect by separating or integrating a whole or a portion of the units mechanically or physically in optional units in accordance with various loads or usages, such as by integrating the redundant function control unit 10c and the connection control unit 10f. Furthermore, a whole or an optional portion of the processing functions of each apparatus can be realized by means of a CPU and a program analyzed and executed by the CPU, or can be realized as wired logic hardware.

4. Communication Guarantee Program

Figure 16:
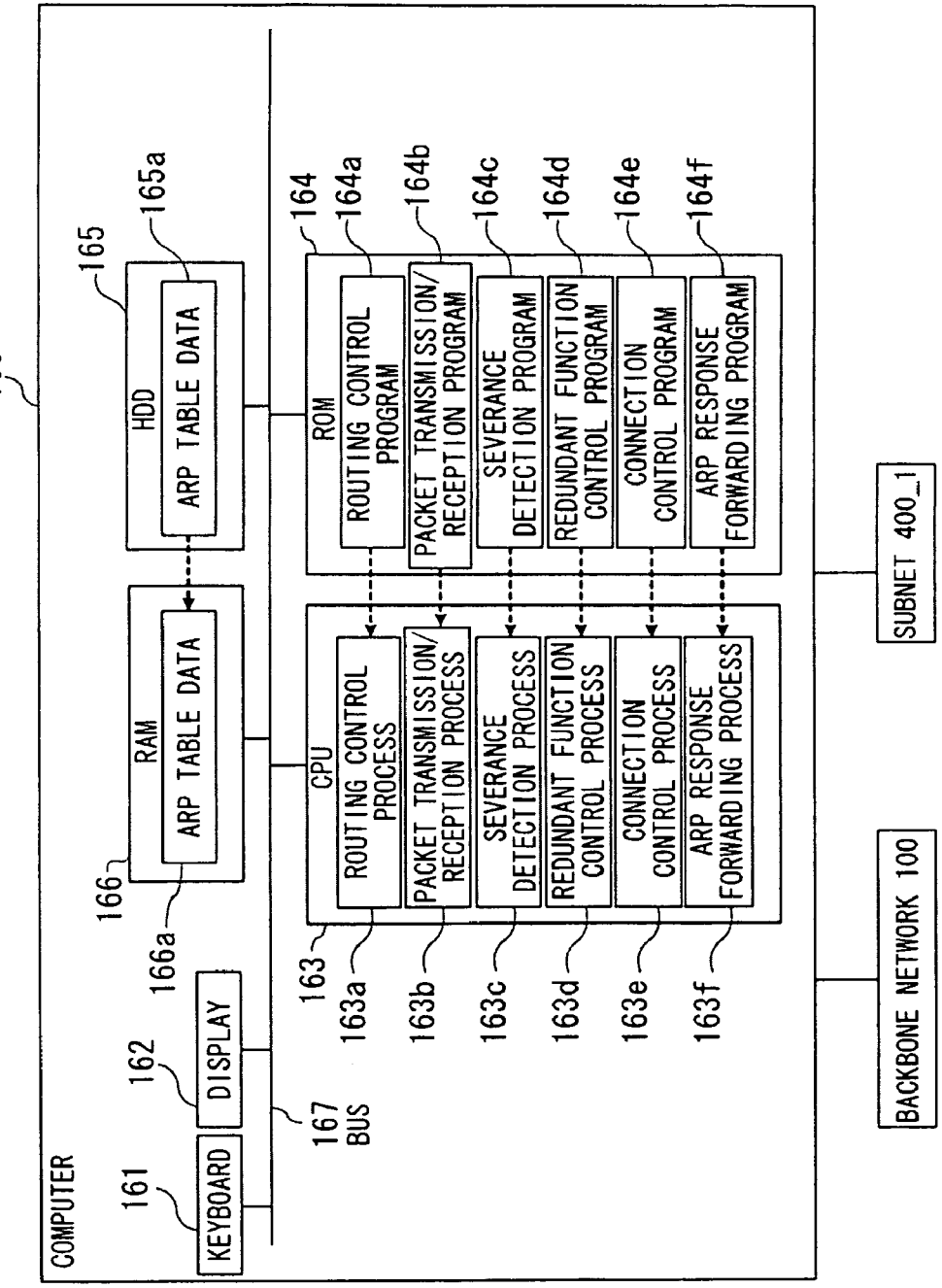
FIG. 16 is a diagram showing a computer which executes a communication guarantee program in the embodiment 1.

Meanwhile, although a description has been given, in the embodiments 1 to 3, of a case of realizing various processes by means of hardware logic, the invention not being limited to this, it is also acceptable to arrange in such a way that a program prepared in advance is executed by a computer Therein, hereafter, a description will be given, using FIG. 16, of one example of a computer, executing the communication guarantee program, which has the same function as the router shown in the embodiment 1. FIG. 16 is a diagram showing a computer which executes the communication guarantee program of the embodiment 1.

As shown in FIG. 16, a computer 160 as an information processing apparatus is configured of a keyboard 161, a display 162, a CPU 163, an ROM 164, an HDD 165, an RAM 166, a bus 167 by which they are connected, and the like, and furthermore, connected to the backbone network 100 and the subnet 400_1.

The communication guarantee program which fulfills the same function as the router 10 shown in the embodiment 1, that is, a routing control program 164a, a packet transmission/reception program 164b, a severance detection program 164c, a redundant function control program 164d, a connection control program 164e, and an ARP response forwarding program 164f are stored in advance in the ROM 164, as shown in FIG. 16. It is also acceptable that the programs 164a to 164f are appropriately integrated or separated in the same way as in the components of the router 10 shown in FIG. 3.

Then, by the CPU 163 reading the programs 164a to 164f from the ROM 164 and executing them, as shown in FIG. 16, the programs 164a to 164f come to function as a routing control process 163a, a packet transmission/reception process 163b, a severance detection process 163c, a redundant function control process 163d, a connection control process 163e, and an ARP response forwarding process 163f. The processes 163a to 163f correspond respectively to the routing control unit 10b, packet transmission/reception unit 10a, severance detection unit 10e, redundant function control unit 10c, connection control unit 10f, and ARP response forwarding unit 10d, shown in FIG. 3.

Also, the HDD 165 is provided with ARP table data 165a, as shown in FIG. 16. Then, the CPU 163 registers ARP table data 166a with respect to the ARP table data 165a and, based on the ARP table data 166a, executes a communication guarantee process.

The programs 164a to 164f do not always have to be stored in the ROM 164 from the beginning, it is also acceptable to arrange in such a way that each program is stored in, for example, a "portable non-transitory physical medium" such as a flexible disk (FD), a CD-ROM, an MO disk, a DVD disk, a magnetooptical disk or an IC card, inserted in the computer 160, or a "fixed non-transitory physical medium" such as an HDD equipped inside or outside the computer 160, or even, "another computer (or server)" connected to the computer 160 via a public line, an internet, an LAN, a WAN or the like, and that the computer 160 reads each program from them and executes it.

What is claimed is:

1. A router that is interposed between a subnet and a backbone network, the subnet includes a plurality of layer 2 switches and a plurality of terminals connected to the layer 2 switches, the terminals are communicating with each other via the layer 2 switches and a master router, wherein the router connects to the master router, the subnet and the backbone network, and originally operates as a backup router, but which can be transitioned to operate as a redundant master router, the router comprising:

a severance detection unit which detects a severance between the layer 2 switches within the subnet;

a redundant function control unit which, in the event that a severance within the subnet has been detected by the severance detection unit:

(i) resumes interrupted communication between the backbone network and the subnet via the router, (ii) receives, from the master router, a copy of an address resolution protocol (ARP) table, and stores the copy of the ARP table in the router, wherein the ARP table includes internet protocol (IP) addresses correlated with MAC addresses of the plurality of terminals, and (iii) transitions the router from operating as a backup router to operating as a redundant master router;
a connection control unit which:
(i) sets up a virtual local area network (VLAN), the VLAN includes intra-subnet routing in the subnet, and backbone network routing that is at least partially outside of the subnet through the backbone network, and
(ii) connects the master router and the router, when the router operates as the redundant master router, via the backbone network routing;
an ARP transmission/reception unit, which in the event that a severance within the subnet has been detected by the severance detection unit:
(i) transmits an ARP request packet to each terminal along either the intra-subnet routing or backbone network routing, wherein the ARP request packet requests an MAC address for each IP address included in the ARP table, and
(ii) receives an ARP response packet from each of the terminals via either the intra-subnet routing of the backbone network routing, wherein each ARP response packet includes the MAC address of the respective terminal; and
an ARP response forwarding unit which generates a learning packet for each ARP response packet, wherein the learning packet has the MAC address extracted from the ARP response packet, and forwards the learning packet to the terminal associated with the MAC address in the learning packet along the same routing from which the respective ARP response packet was received, except in the reverse direction.

2. The router according to claim 1, wherein:
the ARP response forwarding unit generates a bridge protocol data unit (BPDU), which has the received MAC address of the terminal as the transmission source, as the learning packet.

3. The router according to claim 1, wherein, in the event that fixing of the severance within the subnet has been detected by the severance detection unit:
the connection control unit cancels the backbone network routing of the VLAN, the redundant function control unit interrupts communication between the backbone network and the subnet, via the redundant master router, and transitions the router from operating as the redundant master router to operating as the backup router again,
the ARP transmission/reception unit transmits a packet, which has an MAC address of the router as the transmission source, from the router to the master router via intra-subnet routing of the VLAN, transmits an ARP request packet to each terminal, which ARP request packet requests an MAC address for each IP address included in the ARP table, and receives an ARP response packet from each of the terminals via the intra-subnet routing, wherein each ARP response packet includes the MAC address of the respective terminal, and
the ARP response forwarding unit again transmits the ARP request packet received from the ARP transmission/reception unit, which has the MAC address of the router as the transmission source, from the master router to each of the plurality of terminals, and forwards an ARP response packet, which has the MAC address of the terminal as the transmission source, from each respective terminal via the intra-subnet routing.

4. A communication guarantee method which is applied to a router which, being interposed between a subnet and backbone network, the subnet includes a plurality of layer 2 switches and a plurality of terminals connected to the layer 2 switches, the terminals are communicating with each other via the layer 2 switches and a master router, wherein the router connects to the master router, the subnet and the backbone network, and originally operates as a backup router, but which can be transitioned to operate as a redundant master router, and which guarantees communication between the plurality of terminals, comprising:
a severance detection step which detects a severance between the layer 2 switches within the subnet;
a redundant function control step which, in the event that the severance within the subnet has been detected by the severance detection step, includes:
(i) resuming interrupted communication between the router and the backbone network and the subnet,
(ii) sending a copy of an address resolution protocol (ARP) table from the master router to the router and storing the copy of the ARP table in the router, wherein the ARP table includes internet protocol (IP) addresses correlated with MAC addresses of the plurality of terminals, and
(iii) transitioning the router from operating as a backup router to operating as a redundant master router;
a connection control step which:
(i) sets up a virtual local area network (VLAN), the VLAN includes intra-subnet routing in the subnet, and backbone network routing that is at least partially outside of the subnet through the backbone network, and
(ii) connects the master router and the router, when the router operates as the redundant master router via the backbone network routing;
an ARP transmission/reception step which, in the event that a severance within the subnet has been detected during the severance detection step:
(i) transmits an ARP request packet to each terminal along either the intra-subnet routing or the backbone network routing, wherein the ARP request packet requests an MAC address for each IP address included in the ARP table, and
(ii) receives an ARP response packet from each of the terminals via either the intra-subnet routing or the backbone network routing, wherein each ARP response packet includes the MAC address of the respective terminal, and
an ARP response forwarding step which generates a learning packet for each ARP response packet, wherein the learning packet has the MAC address extracted from the ARP response packet and forwards the learning packet to the terminal associated with the MAC address in the learning packet along the same routing from which the respective ARP response packet was received, except in the reverse direction.

5. The communication guarantee method according to claim 4, wherein the ARP response forwarding step generates a bridge protocol data unit (BPDU), which has the received MAC address of the terminal as the transmission source, as the learning packet.

6. The communication guarantee method according to claim 4, wherein:
an ARP transmission/reception unit is included in each of the master router and the router, for transmitting the ARP request packets, and sharing the IP addresses of the plurality of terminals included in the ARP table, and
an ARP response forwarding unit is included in each of the master router and the router, for generating learning packets which have the MAC addresses of the terminals, stored in the ARP response packets received by the ARP transmission/reception units, as the transmission sources, and for forwarding the learning packets to the appropriate terminal, which is the terminal associated with the MAC address in the learning packet, along the same routing from which the respective ARP response packet was received, except in the reverse direction.

7. The communication guarantee method according to claim 4, wherein, in the event that fixing of the severance within the subnet has been detected during the severance detection step:
   the connection control step cancels the backbone network routing of the VLAN, the redundant function control step interrupts communication between the backbone network and the subnet, via the redundant master router, and transitions the router from operating as the redundant master router to operating as the backup router again,
   the ARP transmission/reception step transmits a packet, which has an MAC address of the router as the transmission source, from the router to the master router via the intra-subnet routing of the VLAN, transmits an ARP request packet to each terminal, which ARP request packet requests an MAC address for each address included in the ARP table, and receives an ARP response packet from each of the terminals via the intra-subnet routing, wherein each ARP response packet includes the MAC address of the respective terminal, and
   the ARP response forwarding step again transmits the ARP request packet received from the ARP transmission/reception step, which has the MAC address of the router as the transmission source, from the master router to each of the plurality of terminals, and forwards an ARP response packet, which has the MAC address of the terminal as the transmission source, from each respective terminal via the intra-subnet routing.

8. A non-transitory computer readable recording medium on which is recorded a program for causing a computer, which acts as a router which, being interposed between a subnet and a backbone network, the subnet including a plurality of layer 2 switches and a plurality of terminals connected to the layer 2 switches, the terminals are communicating with each other via the layer 2 switches and a master router, wherein the router connects to the master router, the subnet and the backbone network, and originally operates as a backup router, but can be transitioned to operate as a redundant master router to execute a communication guarantee method which guarantees communication between the plurality of terminals, the method comprising:
   a severance detection step which detects a severance between the layer 2 switches within the subnet;
   a redundant function control step which, in the event that the severance within the subnet has been detected by the severance detection step, includes:
   (i) resuming interrupted communication between the router and the backbone network and the subnet,
   (ii) sending a copy of an address resolution protocol (ARP) table from the master router to the router and storing the copy of the ARP table in the router, wherein the ARP table includes internet protocol (IP) addresses correlated with MAC addresses of the plurality of terminals, and
   (ii) transitioning the router from operating as a backup router to operating as a redundant master router;
   a connection control step which:
   (i) sets up a virtual local area network (VLAN), the VLAN includes intra-subnet routing in the subnet and backbone network routing that is at least partially outside of the subnet through the backbone network,
   (ii) connects the master router and the router, when the router operates as the redundant master router, via the backbone network routing;
   an ARP transmission/reception step which, in the event that a severance within the subnet has been detected during the severance detection step:
   (i) transmits an ARP request packet to each terminal along either the intra-subnet routing or the backbone network routing, wherein the ARP request packet requests an MAC address for each IP address included in the ARP table, and
   (ii) receives an ARP response packet from each of the terminals via either the intra-subnet routing or the backbone network routing, wherein each ARP response packet includes the MAC address of the respective terminal, and
   an ARP response forwarding step which generates a learning packet for each ARP response packet, wherein the learning packet has the MAC address extracted from the ARP response packet, and forwards the learning packet to the terminal associated with the MAC address in the learning packet along the same routing from which the respective ARP response packet was received, except in the reverse direction.

9. The non-transitory computer readable recording method on which is recorded the program for causing the computer to execute the computer communication guarantee method according to claim 8, the method wherein the ARP response forwarding step generates a bridge protocol data unit (BPDU), which has the received MAC address of the terminal as the transmission source, as the learning packet.

10. The non-transitory computer readable recording method on which is recorded the program for causing the computer to execute the computer communication guarantee method according to claim 8, the method wherein:
   an ARP transmission/reception unit is included in each of the master router and the router, for transmitting the ARP request packets, and sharing the IP addresses of the plurality of terminals included in the ARP table, and
   an ARP response forwarding unit is included in each of the master router and the router, for generating learning packets which have the MAC addresses of the terminals, stored in the ARP response packets received by the ARP transmission/reception units, as the transmission sources, and for forwarding the learning packets to the appropriate terminal, which is the terminal associated with the MAC address in the learning packet, along the same routing from which the respective ARP response packet was received, except in the reverse direction.

11. The non-transitory computer readable recording method on which is recorded the program for causing the computer to execute the computer communication guarantee method according to claim 8, wherein, in the event that fixing of the severance within the subnet has been detected during the severance detecting step:
   the connection control step cancels the backbone network routing of the VLAN,
   the redundant function control step interrupts communication between the backbone network and the subnet, via the redundant master router, and transitions the router from operating as the redundant master router to operating as the backup router again,
   the ARP transmission/reception step transmits a packet, which has an MAC address of the router as the transmission source, from the router to the master router via the intra-subnet routing of the VLAN, transmits an ARP request packet to each terminal, which ARP request packet requests an MAC address for each IP address included in the ARP table, and receives an ARP response packet from each of the terminals via the intra-subnet routing, wherein each ARP response packet includes the MAC address of the respective terminal, and the ARP response forwarding step again transmits the ARP request packet received from the ARP transmission/reception step, which has the MAC address of the router as the transmission source, from the master router to each of the plurality of terminals, and forwards an ARP response packet, which has the MAC address of the terminal as the transmission source, from each respective terminal via the intra-subnet routing.

* * * * *

UNITED STATES PATENT AND TRADEMARK OFFICE
CERTIFICATE OF CORRECTION

| | | |
|---|---|---|
| PATENT NO. | : 7,911,941 B2 | Page 1 of 1 |
| APPLICATION NO. | : 12/038468 | |
| DATED | : March 22, 2011 | |
| INVENTOR(S) | : Kaneko | |

It is certified that error appears in the above-identified patent and that said Letters Patent is hereby corrected as shown below:

<u>In the Claims</u>:

| | |
|---|---|
| Claim 1, Col. 23, line 16 | After "or" insert --the-- |
| Claim 1, Col. 23, line 21 | Delete "routing of" and replace with --routing or-- |
| Claim 3, Col. 23, line 50 | After "via" insert --the-- |
| Claim 4, Col. 23, line 67 | After "and" insert --a-- |
| Claim 7, Col. 25, line 24 | Delete "each address" and replace with --each IP address-- |
| Claim 8, Col. 25, line 47 | After "router" insert a --,-- |
| Claim 8, Col. 26, line 4 | After "router" delete the "," |
| Claim 9, Col. 26, line 27 | Delete "method" and replace with --medium-- |
| Claim 10, Col. 26, line 35 | Delete "method" and replace with --medium-- |
| Claim 11, Col. 26, line 53 | Delete "method" and replace with --medium-- |

Signed and Sealed this
Twelfth Day of July, 2011

David J. Kappos
*Director of the United States Patent and Trademark Office*